United States Patent
Harada

(10) Patent No.: US 6,992,839 B2
(45) Date of Patent: Jan. 31, 2006

(54) LENS SYSTEM AND OPTICAL DEVICE HAVING THE SAME

(75) Inventor: Akira Harada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 11/087,543

(22) Filed: Mar. 24, 2005

(65) Prior Publication Data
US 2005/0162756 A1    Jul. 28, 2005

Related U.S. Application Data

(62) Division of application No. 09/851,937, filed on May 10, 2001.

(30) Foreign Application Priority Data
May 12, 2000   (JP) ............................. 2000-140119

(51) Int. Cl.
  *G02B 9/34* (2006.01)

(52) U.S. Cl. ..................... 359/773; 359/774; 359/785

(58) Field of Classification Search ........ 359/771–774, 359/776, 754–758, 763–764, 784–785, 676, 359/683–684, 686–687, 689–690, 693
See application file for complete search history.

(56) References Cited

U.S. PATENT DOCUMENTS

| | | | |
|---|---|---|---|
| 4,437,734 A | 3/1984 | Iizuka | 359/745 |
| 4,534,626 A * | 8/1985 | Mihara | 359/745 |
| 5,044,706 A | 9/1991 | Chen | 359/357 |
| 5,067,803 A | 11/1991 | Ohno | 359/708 |
| 5,444,569 A | 8/1995 | Broome | 358/435 |
| 5,627,685 A * | 5/1997 | Yamanashi | 359/745 |
| 5,627,686 A * | 5/1997 | Ohshita | 359/745 |
| 5,790,321 A | 8/1998 | Goto | 359/742 |
| 5,842,055 A * | 11/1998 | Tamura | 396/72 |
| 5,871,266 A | 2/1999 | Negishi et al. | 353/98 |
| 5,898,525 A * | 4/1999 | Suzuki | 359/684 |
| 5,909,322 A | 6/1999 | Bietry | 359/793 |
| 6,246,833 B1 | 6/2001 | Harada | 396/79 |
| 6,268,969 B1 * | 7/2001 | Ogawa | 359/745 |
| 2001/0003490 A1 | 6/2001 | Kawasaki et al. | 359/385 |
| 2001/0015848 A1 | 8/2001 | Nakai | 359/565 |
| 2001/0021005 A1 | 9/2001 | Kulseko et al. | 353/33 |
| 2003/0021031 A1 | 1/2003 | Suzuki | 359/557 |

FOREIGN PATENT DOCUMENTS

| | | | |
|---|---|---|---|
| JP | 1-237611 | * | 9/1989 |
| JP | 4-213421 | | 8/1992 |
| JP | 6-324262 | | 11/1994 |

OTHER PUBLICATIONS

A.D. Lathman, et al., "Binary Optics in Lens Design", Proceedings of the SPIE: International Lens Design Conference, vol. 1354, Jun. 11-14, 1990, pp. 297-309.

A.P. Wood, "Using hybrid refractive-diffractive elements in infrared Petzval objectives", Proceedings of the SPIE: International Lens Design Conference, vol. 1354, Jun. 11-14, 1990, pp. 316-323.

(Continued)

*Primary Examiner*—Jordan M. Schwartz
(74) *Attorney, Agent, or Firm*—Fitzpatrick, Cella, Harper & Scinto

(57) ABSTRACT

A lens system has a plurality of lenses, a stop, and a diffractive surface, the entire lens system moves during focusing, and the lens system satisfies the condition of $\beta \geq 0.5$, where $\beta$ is a maximum photographic magnification.

6 Claims, 15 Drawing Sheets

OTHER PUBLICATIONS

M.W. Farn, et al., "Diffractive Doublet Corrected On-Axis at Two Wavelengths," Proceedings of the SPIE: International Lens Design Conference, vol. 1354 (Jun. 11-14, 1990), pp. 24-29.

C. Londoño, et al., "The Design of Achromatized Hybrid Diffractive Lens System," Proceedings of the SPIE: International Lens Design Conference, vol. 1354 (Jun. 11-14, 1990), pp. 30-37.

* cited by examiner

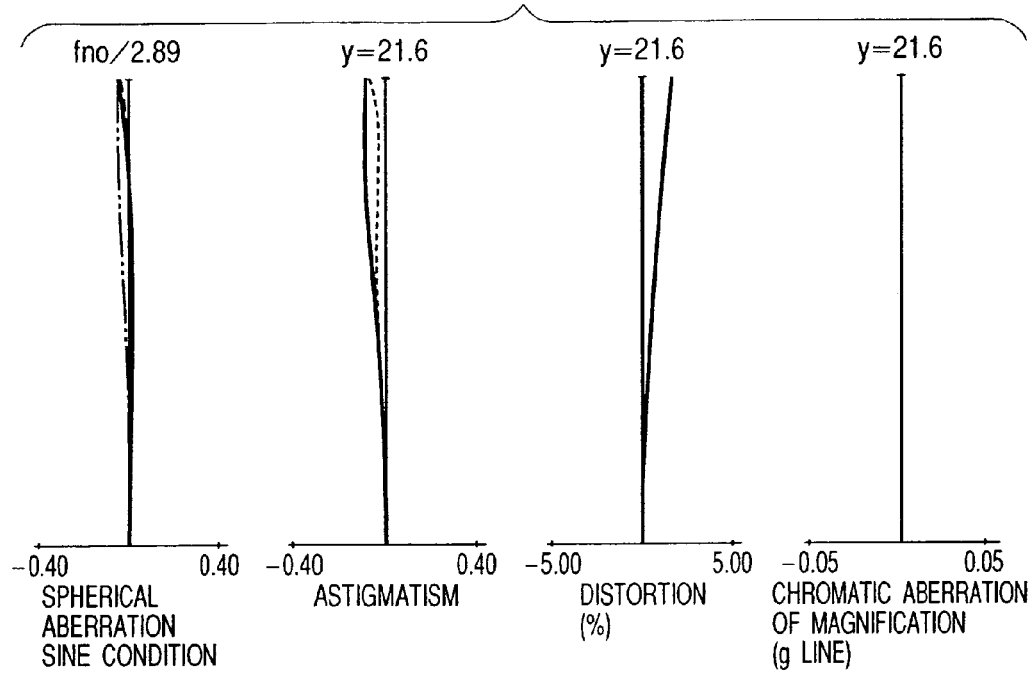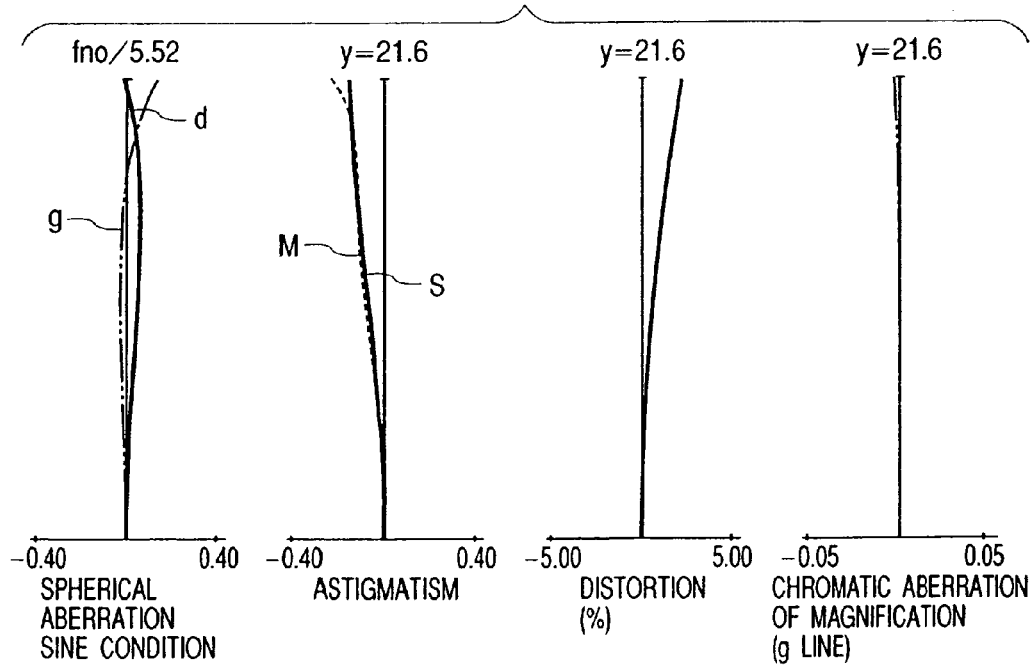

LENS SYSTEM AND OPTICAL DEVICE HAVING THE SAME

This application is a division of application Ser. No. 09/851,937 filed May 10, 2001.

BACKGROUND OF THE INVENTION

1. Field of the Invention

The present invention relates to a lens system and an optical device using the same and, more particularly, is suitably applicable to optical devices such as silver-film cameras, video cameras, electronic still cameras, and so on with high optical performance, which lens system is well corrected for aberration variations during focusing in a wide subject range from an object at infinity to an object at a near distance.

2. Related Background Art

Conventionally, there are lens systems called macrolenses or microlenses (which will be called hereinafter "macrolenses" together) intended for the principal purpose of taking pictures of near objects with optical devices such as photographic cameras, video cameras, video still cameras, and so on.

The macrolenses are designed to yield high optical performance, particularly, for near objects, as compared with other taking lenses such as ordinary standard lenses, telephoto lenses, and so on.

In general, the macrolenses increase, particularly, longitudinal (axial) chromatic aberration and lateral chromatic aberration (chromatic aberration of magnification) among various aberrations with increase in the photographic magnification and it becomes difficult to correct them well.

Even if the lens systems are corrected well for spherical aberration, coma, astigmatism, etc. among the various aberrations, good optical performance cannot be expected unless the axial chromatic aberration and chromatic aberration of magnification are corrected well.

There are conventional methods of reducing chromatic aberration of optics by provision of a diffracting optical element with diffraction action on a lens surface or in part of the optics, making use of the physical phenomenon that a refractive surface and a diffractive surface in optics have reverse chromatic aberrations for rays of a certain reference wavelength, which are disclosed, for example, in documents such as SPIE Vol. 1354 International Lens Design Conference (1990) and the like, Japanese Patent Applications Laid-Open No. 4-213421 and No. 6-324262, U.S. Pat. No. 5,044,706, and so on.

The diffracting optical elements disclosed in these references utilize the configuration wherein a diffraction grating of periodic structure is arranged rotationally symmetric about a certain axis, e.g., the optical axis and periodic pitches of the diffraction grating are gradually changed whereby the diffraction action brought about by the ring structure of the periodic pattern acts as a lens.

These diffracting optical elements exhibit a great correction effect, particularly, for chromatic aberration appearing at a refractive surface because of dispersion of glass, and can be provided with an effect like an aspheric lens by changing periods of the periodic pattern, thus achieving a great effect of reducing aberration.

Specific structures of the diffracting optical elements for obtaining this diffraction action are called kinoform and there are well-known kinoform structures, e.g., those having continuous spacings between portions with the phase difference of $2\pi$, those having binary shape (step shape) wherein a continuous phase difference distribution is approximated to a step shape, those wherein the microscopic periodic pattern is approximated to a triangular wave shape, and so on.

Such diffracting optical elements are fabricated by semiconductor processes such as lithography and the like, by cutting, or the like.

Particularly, the diffracting optical elements of the step shape (binary shape) among such diffracting optical elements are now fabricated readily with very high resolution and high accuracy by the semiconductor processes of lithography and the like.

In general, if the photographic magnification range is expanded in the macrolenses, particularly, toward higher magnifications, there will appear more aberration with change in the photographic magnification and it will become difficult to correct it well.

For example, if a macrolens designed on the basis of the photographic magnification of 1/10 is intended to expand the photographic magnification toward a high magnification of 1× and to take a picture, it will produce extremely great spherical aberration, curvature of field, coma, chromatic aberration, and so on.

SUMMARY OF THE INVENTION

An object of the present invention is to provide a lens system with high optical performance well corrected for aberration in photography at high magnifications and an optical device using the same.

A specific object of the present invention is to provide a lens system well corrected for axial chromatic aberration and chromatic aberration of magnification (longitudinal and lateral chromatic aberrations), which degrade with increase in the photographic magnification, and an optical device using the same.

For accomplishing the above objects, one aspect of the present invention is a lens system comprising;

a plurality lenses, a stop, and a diffractive surface, said lens system moving the whole or part of the lens system during focusing and satisfying the following condition:

$$\beta \geq 0.5,$$

where $\beta$ is a maximum photographic magnification.

In a more preferred form, part of the lens system moves during focusing, and said a plurality of lenses is symmetric or substantially symmetric with respect to said stop.

In a more preferred form, said diffractive surface consists of a diffraction grating rotationally symmetric with respect to the optical axis, wherein when the phase $\phi(h)$ of said diffraction grating is given by the following equation:

$$\phi(h)=2\pi/\lambda*(C1*h2+C2*h4+C3*h6+\ldots+Ci*h2i),$$

where $\lambda$ is an arbitrary wavelength in the visible region, $C_i$ aspheric phase coefficients, and $h$ a height from the optical axis, the following conditions are satisfied:

$$C1<0 \text{ and } C2>0.$$

In a more preferred form, the lens system satisfies the following condition:

$$|\Delta S/f|>1.0,$$

where ΔS is a maximum moving distance of the whole of said lens system during focusing from an object at infinity to an object at a near distance, and f a focal length of the entire lens system.

For accomplishing the above objects, another aspect of the present invention is a lens system comprising;

a diffractive surface; and a first lens unit of a positive refracting power, a stop, and a second lens unit of a positive refracting power in the order (named) from the object side, said lens system moves the whole of the lens system during focusing and changes air spaces before and after said stop during focusing.

In a more preferred form, the lens system satisfies the following condition:

$0.7 < |\Delta s1/\Delta s2| < 1.3$, where $\Delta s1$ is a moving distance of said first lens unit during focusing and $\Delta s2$ a moving distance of said second lens unit during focusing.

In a more preferred form, the lens system satisfies the following conditions:

$0.7 < f1/f < 1.3$, and $1.5 < f2/f < 2.5$, where f1 is a focal length of said first lens unit, f2 a focal length of said second lens unit, and f a focal length of the entire lens system.

In a more preferred form, said diffractive surface consists of a diffraction grating rotationally symmetric with respect to the optical axis, wherein when the phase φ(h) of said diffraction grating is given by the following equation:

$\phi(h) = 2\pi/\lambda * (C1*h2 + C2*h4 + C3*h6 + \ldots + Ci*h2i)$, where λ is an arbitrary wavelength in the visible region, Ci aspheric phase coefficients, and h a height from the optical axis, the following conditions are satisfied:

C1<0 and C2>0.

In a more preferred form, the lens system satisfies the following condition:

$|\Delta s1/f| > 1.0$, where $\Delta s1$ is a maximum moving length of said first lens unit during focusing from an object at infinity to an object at a near distance, and f a focal length of the entire lens system.

For accomplishing the above objects, another aspect of the present invention is a lens system comprising;

a diffractive surface; and a first lens unit of a positive refracting power, a second lens unit of a positive refracting power, and a lens unit of a negative refracting power closest to an image, in the order (named) from the object side, wherein during focusing from an object at infinity to an object at a near distance said first lens unit and said second lens unit move toward the object side and an air space increases on the said object side from said lens unit of the negative refracting power.

In a more preferred form, the lens system satisfies the following condition:

$0.7 < |\Delta s1/\Delta s2| < 1.3$, where $\Delta s1$ is a moving distance of said first lens unit during focusing and $\Delta s2$ a moving distance of said second lens unit during focusing.

In a more preferred form, the lens system satisfies the following conditions:

$0.6 < f1/f < 1.1$, $1.5 < f2/f < 3.5$, and $-6.0 < fR/f < -2.0$, where f1 is a focal length of said first lens unit, f2 a focal length of said second lens unit, fR a focal length of said lens unit of the negative refracting power, and f a focal length of the entire lens system.

In a more preferred form, said diffractive surface consists of a diffraction grating rotationally symmetric with respect to the optical axis, wherein when the phase φ(h) of said diffraction grating is given by the following equation:

$\phi(h) = 2\lambda/\lambda * (C1*h2 + C2*h4 + C3*h6 + \ldots + Ci*h2i)$, where λ is an arbitrary wavelength in the visible region, Ci aspheric phase coefficients, and h a height from the optical axis, the following conditions are satisfied:

C1<0 and C2>0.

In a more preferred form, said first lens unit or second lens unit comprises a diffractive surface.

In a more preferred form, said first lens unit and second lens unit comprise their respective, diffractive surfaces.

In a more preferred form, said plurality of lenses of the negative refracting power is fixed during the focusing.

In a more preferred form, the lens system satisfies the following condition:

$|\Delta s1/f| > 1.0$, where $\Delta s1$ is a moving distance of the first lens unit during said focusing and f a focal length of the entire lens system.

For accomplishing the above objects, another aspect of the present invention is a lens system comprising;

a diffractive surface; and a first lens unit of a positive refracting power and a second lens unit of a negative refracting power in the order (named) from the object side, wherein during focusing from an object at infinity to an object at a near distance, said first lens unit moves toward said object side and a spacing increases between said first lens unit and said second lens unit.

In a more preferred form, the lens system satisfies the following conditions:

$0.5 < f1/f < 1.1$, and $-2.5 < f2/f < -1.5$, where f1 is a focal length of said first lens unit, f2 a focal length of said second lens unit, and f a focal length of the entire lens system.

In a more preferred form, said first lens unit comprises a diffractive surface.

In a more preferred form, said diffractive surface consists of a diffraction grating rotationally symmetric with respect to the optical axis, wherein when the phase φ(h) of said diffraction grating is given by the following equation:

$\phi(h) = 2\lambda/\lambda * (C1*h2 + C2*h4 + C3*h6 + \ldots + Ci*h2i)$, where λ is an arbitrary wavelength in the visible region, Ci aspheric phase coefficients, and h a height from the optical axis, the following conditions are satisfied:

C1<0 and C2>0.

In a more preferred form, said second lens unit is fixed during the focusing.

For accomplishing the above objects, another aspect of the present invention is a lens system comprising;

a diffractive surface; and a first lens unit of a positive refracting power and a second lens unit of a positive refracting power in the order (named) from the object side, wherein during focusing from an object at infinity to an object at a near distance, said first lens unit moves toward the object side.

In a more preferred form, the lens system satisfies the following conditions:

$0.7 < f1/f < 1.3$, and $f2/f > 10$, where f1 is a focal length of said first lens unit, f2 a focal length of said second lens unit, and f a focal length of the entire lens system.

In a more preferred form, said first lens unit comprises said diffractive surface.

In a more preferred form, said diffractive surface consists of a diffraction grating rotationally symmetric with respect to the optical axis, wherein when the phase φ(h) of said diffraction grating is given by the following equation:

$\phi(h) = 2\pi/\lambda * (C1*h2 + C2*h4 + C3*h6 + \ldots + Ci*h2i)$, where λ is an arbitrary wavelength in the visible region, Ci aspheric phase coefficients, and h a height from the optical axis, the following conditions are satisfied:

C1<0 and C2>0.

In a more preferred form, said second lens unit is fixed during the focusing.

For accomplishing the above objects, another aspect of the present invention is a lens system comprising;

a diffractive surface; and a first lens unit of a positive refracting power, a second lens unit of a negative refracting power, and a third lens unit of a positive refracting power in the order (named) from the object side, wherein during focusing from an object at infinity to an object at a near distance, said first lens unit is fixed, said second lens unit moves toward an image side, and said third lens unit moves toward the object side.

In a more preferred form, the lens system satisfies the following condition:

$0.50 < \Delta s2/|\Delta s3| < 1.50$, where Δs2 is a moving distance of said second lens unit during the focusing and Δs3 a moving distance of said third lens unit during the focusing.

In a more preferred form, the lens system satisfies the following conditions:

$0.40 < f1/f < 0.65$, $-0.50 < f2/f < -0.25$, and $0.40 < f3/f < 1.10$, where f1 is a focal length of said first lens unit, f2 a focal length of said second lens unit, f3 a focal length of said third lens unit, and f a focal length of the entire lens system.

In a more preferred form, said diffractive surface consists of a diffraction grating rotationally symmetric with respect to the optical axis, wherein when the phase φ(h) of said diffraction grating is given by the following equation:

$\phi(h) = 2\pi/\lambda * (C1*h2 + C2*h4 + C3*h6 + \ldots + Ci*h2i)$, where λ is an arbitrary wavelength in the visible region, Ci aspheric phase coefficients, and h a height from the optical axis, the following conditions are satisfied:

C1<0 and C2>0.

In a more preferred form, said first lens unit comprises a positive lens closest to the object.

In a more preferred form, a stop is placed between said second lens unit and said third lens unit and said stop is fixed during the focusing.

In a more preferred form, the lens system comprises a flare cut stop in the optical path.

In a more preferred form, said second lens unit and said third lens unit both comprise their respective cemented lenses.

For accomplishing the above objects, another aspect of the present invention is a lens system comprising;

a diffractive surface; and a first lens unit of a positive refracting power, a second lens unit of a negative refracting power, a third lens unit of a positive refracting power, and a fourth lens unit of a negative refracting power in the order (named) from the object side, wherein during focusing from an object at infinity to an object at a near distance, the first lens unit is fixed, said second lens unit moves toward an image side, and said third lens unit moves toward the object side.

In a more preferred form, the lens system satisfies the following condition:

$0.50 < \Delta s2/|\Delta s3| < 1.50$, where Δs2 is a moving distance of said second lens unit during the focusing and Δs3 a moving distance of said third lens unit during the focusing.

In a more preferred form, the lens system satisfies the following conditions:

$0.40 < f1/f < 0.70$, $-0.45 < f2/f < -0.25$, $0.25 < f3/f < 0.55$, and $-1.0 < f4/f < -0.4$, where f1 is a focal length of said first lens unit, f2 a focal length of said second lens unit, f3 a focal length of said third lens unit, f4 a focal length of said fourth lens unit, and f a focal length of the entire lens system.

In a more preferred form, said first lens unit comprises a positive lens closest to the object.

In a more preferred form, a stop is placed between said second lens unit and said third lens unit and said stop is fixed during the focusing.

In a more preferred form, the lens system comprises a flare cut stop in the optical path.

In a more preferred form, said second lens unit and said third lens unit both comprise their respective cemented lenses.

In a more preferred form, said diffractive surface consists of a diffraction grating rotationally symmetric with respect to the optical axis, wherein when the phase φ(h) of said diffraction grating is given by the following equation:

$$\phi(h)=2\pi/\lambda*(C1*h2+C2*h4+C3*h6+\ldots+Ci*h2i),$$

where λ is an arbitrary wavelength in the visible region, Ci aspheric phase coefficients, and h a height from the optical axis, the following conditions are satisfied:

$$C1<0 \text{ and } C2>0.$$

For accomplishing the above objects, another aspect of the present invention is a lens system comprising;

a diffractive surface; and a first lens unit of a positive refracting power, a second lens unit of a negative refracting power, a third lens unit of a positive refracting power, and a fourth lens unit of a positive refracting power in the order (named) from the object side, wherein during focusing from an object at infinity to an object at a near distance, the first lens unit is fixed, said second lens unit moves toward an image side, and said third lens unit moves toward the object side.

In a more preferred form, the lens system satisfies the following condition:

$$0.50<|\Delta s2/|\Delta s3|<4.00,$$

where Δs2 is a moving distance of said second lens unit during the focusing and Δs3 a moving distance of said third lens unit during the focusing.

In a more preferred form, the lens system satisfies the following conditions:

$$0.20<f1/f<0.60,$$

$$-0.50<f2/f<-0.10,$$

$$0.50<f3/f<1.50, \text{ and}$$

$$0.70<f4/f<1.80,$$

where f1 is a focal length of said first lens unit, f2 a focal length of said second lens unit, f3 a focal length of said third lens unit, f4 a focal length of said fourth lens unit, and f a focal length of the entire lens system.

In a more preferred form, said diffractive surface consists of a diffraction grating rotationally symmetric with respect to the optical axis, wherein when the phase φ(h) of said diffraction grating is given by the following equation:

$$\phi(h)=2\pi/\lambda*(C1*h2+C2*h4+C3*h6+\ldots+Ci*h2i),$$

where λ is an arbitrary wavelength in the visible region, Ci aspheric phase coefficients, and h a height from the optical axis, the following conditions are satisfied:

$$C1<0 \text{ and } C2>0.$$

In a more preferred form, during the focusing, said fourth lens unit is fixed relative to the image plane.

In a more preferred form, the lens system comprises a stop in the optical path, wherein said stop is fixed during the focusing.

In a more preferred form, the lens system comprises a flare cut stop in the optical path.

For accomplishing the above objects, a further aspect of the present invention is an optical device comprising the lens system according to either one of the aforementioned aspects, and a housing which holds the lens system.

BRIEF DESCRIPTION OF THE DRAWINGS

FIG. 11 is lens aberration charts in a photographic state of ∞ in the fourth embodiment of the present invention;

FIG. 12 is lens aberration charts in a photographic state of 1× in the fourth embodiment of the present invention;

DETAILED DESCRIPTION OF THE PREFERRED EMBODIMENTS

Figure 1A:
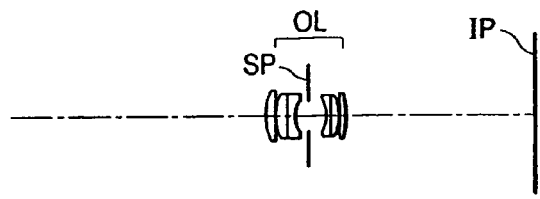
FIGS. 1A and 1B are cross-sectional views of lenses in the first embodiment of the present invention.
Figure 4A:
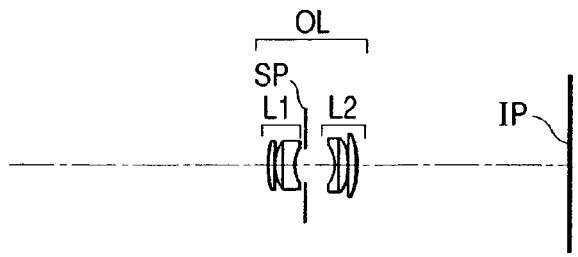
FIGS. 4A and 4B are cross-sectional views of lenses in the second embodiment of the present invention.
Figure 7A:
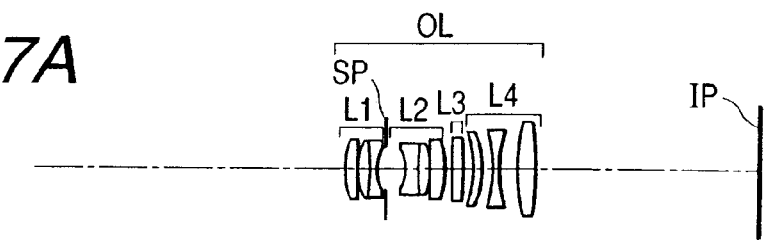
FIGS. 7A and 7B are cross-sectional views of lenses in the third embodiment of the present invention.

FIGS. 1A and 1B, 4A and 4B, and 7A and 7B are cross-sectional views of lenses in the first, second, and third embodiments of the present invention. In the lens cross-sectional views, FIGS. 1A, 4A, and 7A show a photographic state at the magnification of 1× and FIGS. 1B, 4B, and 7B a photographic state at the photographic magnification of 5×.

Figure 10A:
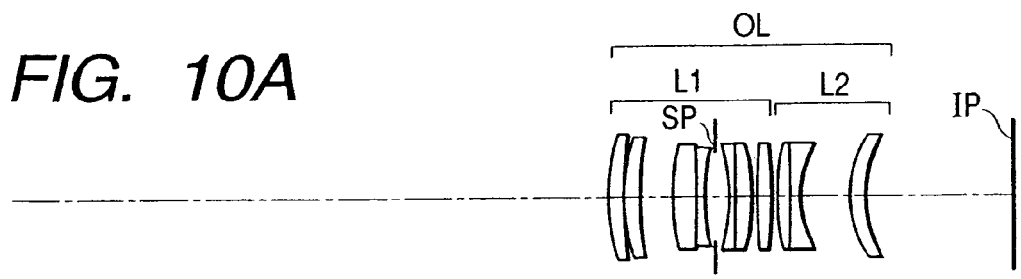
FIGS. 10A and 10B are cross-sectional views of lenses in the fourth embodiment of the present invention.
Figure 10B:
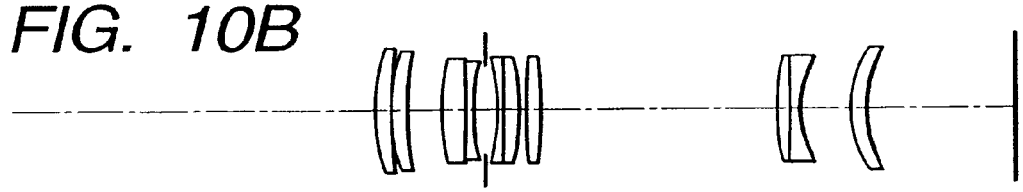

FIGS. 10A and 10B are cross-sectional views of lenses in the fourth embodiment. In the lens cross-sectional views, FIG. 10A shows a photographic state of photographing an object at infinity and FIG. 10B a photographic state at the photographic magnification of 1×.

Figure 13A:
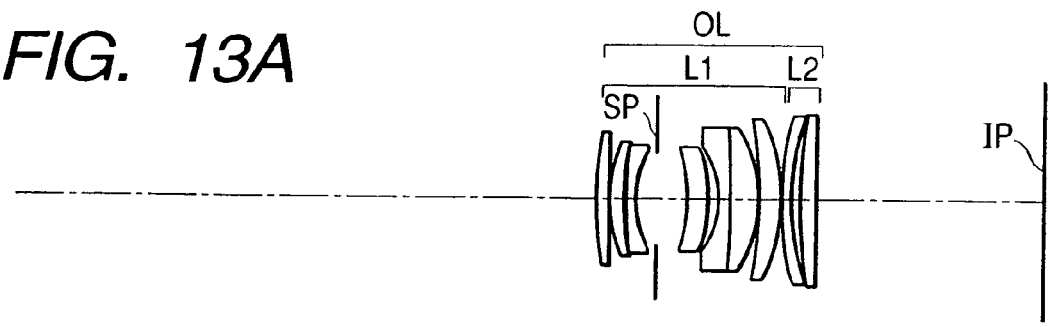
FIGS. 13A and 13B are cross-sectional views of lenses in the fifth embodiment of the present invention.
Figure 13B:
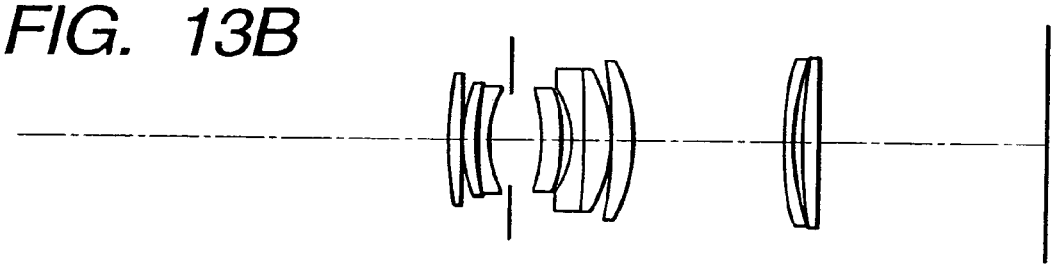
Figure 14:
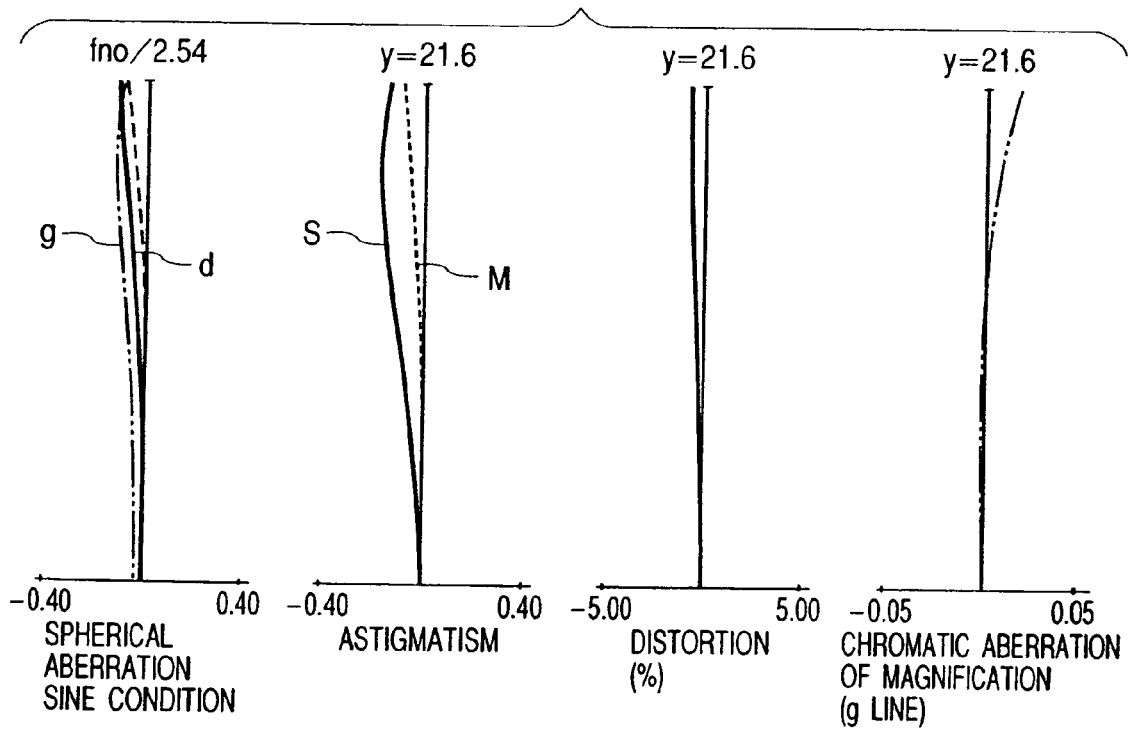
FIG. 14 is lens aberration charts in a photographic state of ∞ in the fifth embodiment of the present invention.
Figure 15:
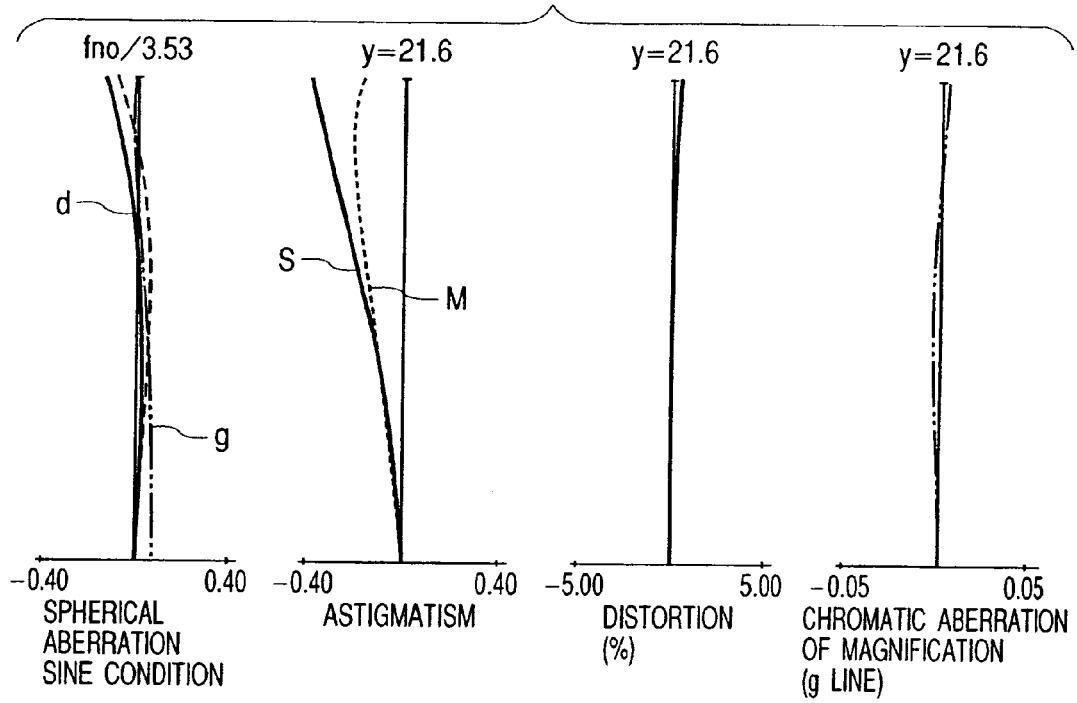
FIG. 15 is lens aberration charts in a photographic state of 0.5× in the fifth embodiment of the present invention.

FIGS. 13A and 13B are cross-sectional views of lenses in the fifth embodiment. In the lens cross-sectional views, FIG. 13A shows a photographic state of photographing an object at infinity and FIG. 13B a photographic state at the photographic magnification of 0.5×.

Figure 16A:
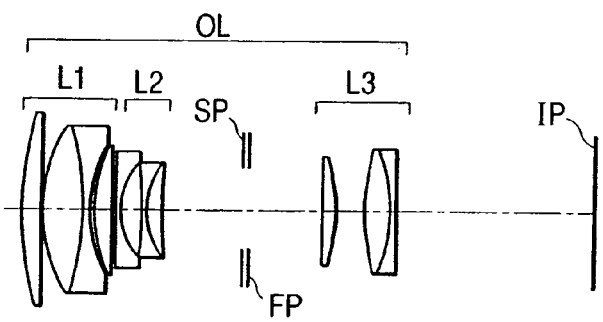
FIGS. 16A and 16B are cross-sectional views of lenses in the sixth embodiment of the present invention.
Figure 19A:
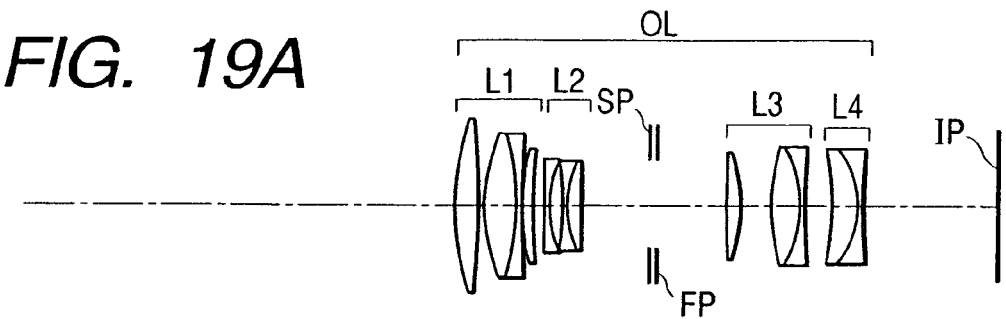
FIGS. 19A and 19B are cross-sectional views of lenses in the seventh embodiment of the present invention.
Figure 22A:
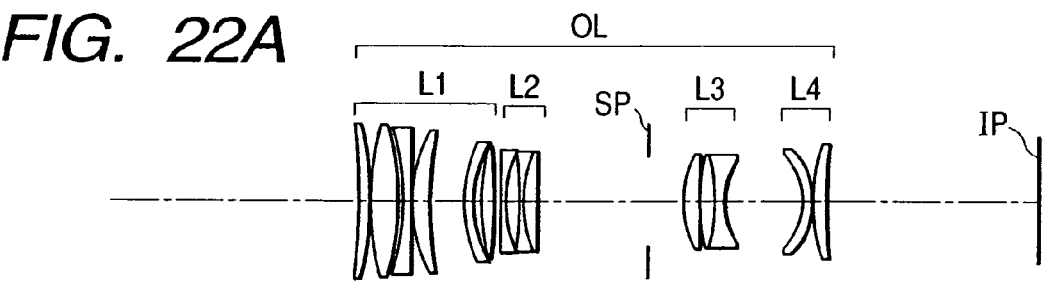
FIGS. 22A and 22B are cross-sectional views of lenses in the eighth embodiment of the present invention.

FIGS. 16A and 16B, FIGS. 19A and 19B, and FIGS. 22A and 22B are cross-sectional views of lenses in the sixth, seventh, and eighth embodiments. In the lens cross-sectional views, FIGS. 16A, 19A, and 22A show a photographing state of photographing an object at infinity and FIGS. 16B, 19B, and 22B a photographing state at the photographic magnification of 1×.

In the lens cross-sectional views, Li represents the ith lens unit, SP a stop, and Ip the image plane. FP indicates a flare cut stop.

According to the present invention, a diffracting optical element (a diffractive optical surface) is provided in a portion of the optical system, so as to well correct variations in aberrations, particularly, variations in chromatic aberration with increase in the photographic magnification.

The diffracting optical element herein is more preferably comprised of a diffraction grating rotationally symmetric with respect to the optical axis, and the phase $\phi(h)$ of the diffraction grating is given by the following equation:

$$\phi(h) = 2\pi/\lambda \cdot (C1 \cdot h2 + C2 \cdot h4 + C3 \cdot h6 + \ldots + Ci \cdot h2i) \quad (a),$$

where $\lambda$ is an arbitrary wavelength in the visible region, $Ci$ ($i=1, 2, \ldots$) aspheric phase coefficients, and $h$ a height from the optical axis.

First, the features of the respective embodiments will be described in order on the basis of the respective drawings.

First Embodiment

Figure 1B:
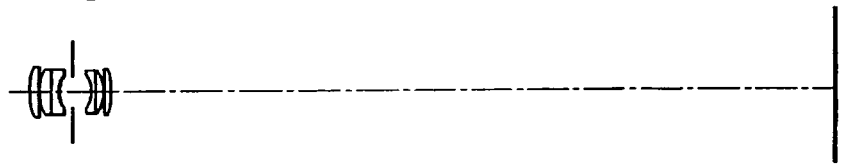
Figure 2:
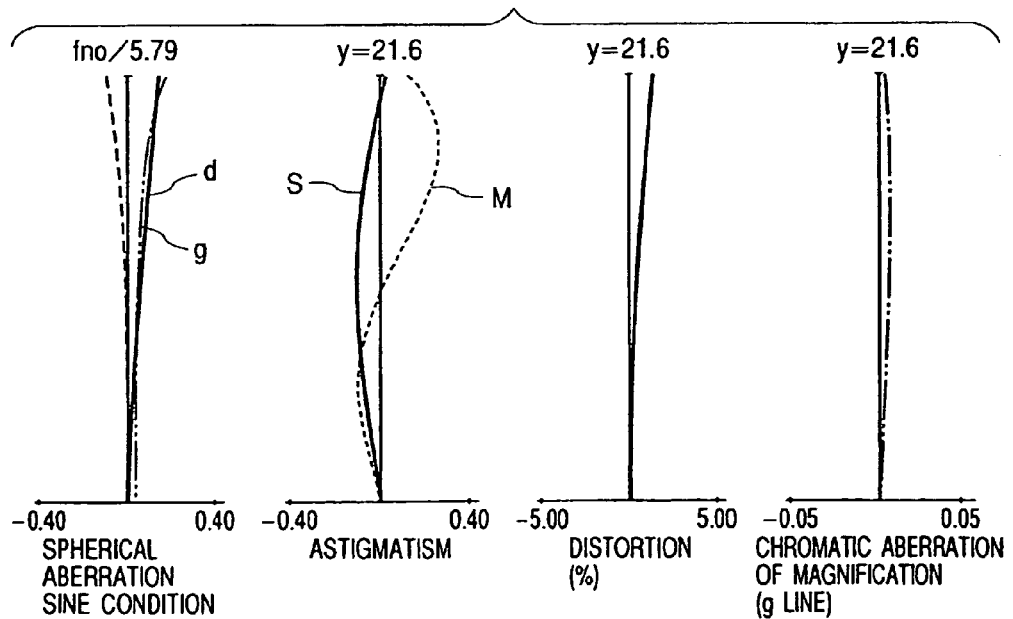
FIG. 2 is lens aberration charts in a photographic state of 1× in the first embodiment of the present invention.
Figure 3:
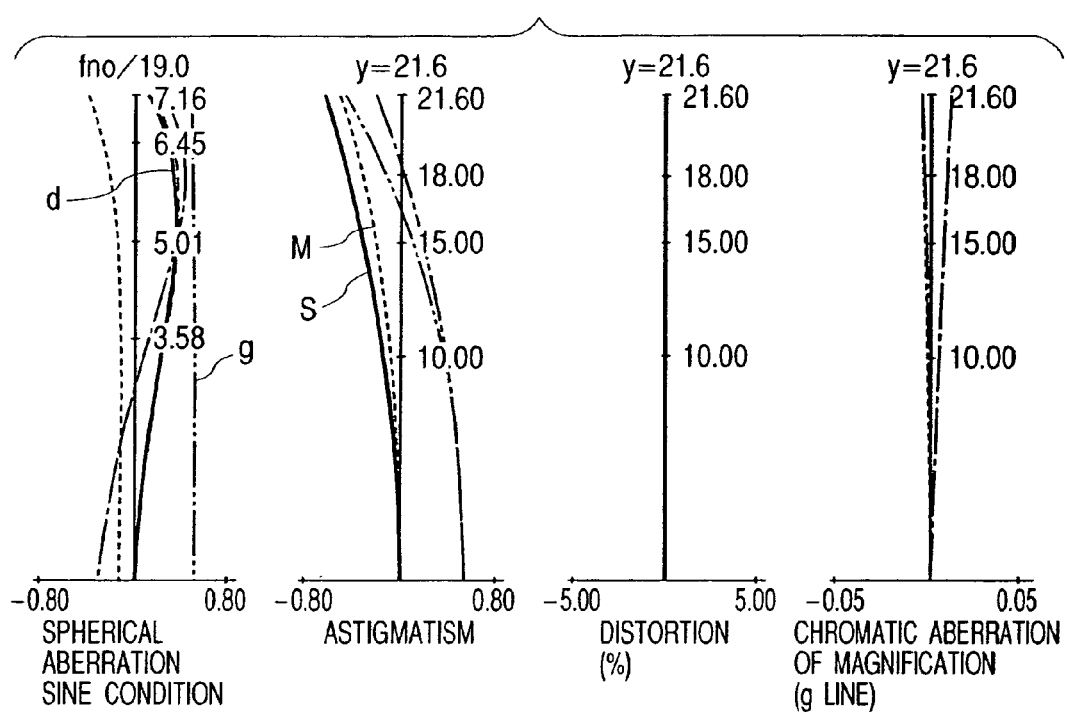
FIG. 3 is lens aberration charts in a photographic state of 5.0× in the first embodiment of the present invention.

FIGS. 1A and 1B are views showing the first embodiment, in which the lens system OL has at least one diffractive optical surface in the lens system, is symmetric or substantially symmetric with respect to a stop SP, is arranged to move the whole or part of the lens system during focusing, and is characterized by satisfying Condition (1) below.

$$\beta \geq 0.5 \quad (1)$$

Here $\beta$ is a maximum photographic magnification.

In this first embodiment the first surface is comprised of a diffractive optical surface.

In the first embodiment the lens system is preferably constructed to satisfy at least one of the following conditions.

(1-1) The lenses constituting the lens system are arranged symmetric or substantially symmetric with respect to the stop. By "symmetric or substantially symmetric" herein it is meant that at least one of three below is satisfied:

refracting powers (whether positive or negative) are identical and numbers of lenses are equal with respect to the stop; or refracting powers (whether positive or negative) are identical, numbers of lenses are equal, and numbers of lens surfaces are equal with respect to the stop; or refracting powers (whether positive or negative) are identical and directions of lens surfaces are the same with respect to the stop.

In this first embodiment, the lens system is more preferably constructed to further satisfy the following conditions.

(1-2) When the diffractive optical surface is given by foregoing Eq (a), it is preferably one satisfying the following conditions:

$$C1 < 0, \text{ and}$$

$$C2 > 0.$$

(1-3) A maximum movement distance of the entire lens system in focusing preferably satisfies Condition (2) below.

$$|\Delta s/f| > 1.0 \quad (2)$$

Here $\Delta s$ is the maximum movement distance of the lens units in focusing from an object at infinity (infinity object) to an object at a near distance (near object), and $f$ the focal length of the entire lens system.

Second Embodiment

Figure 4B:
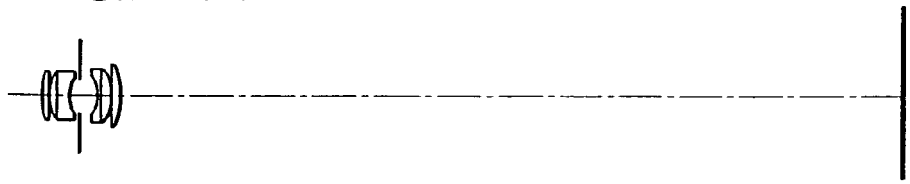
Figure 5:
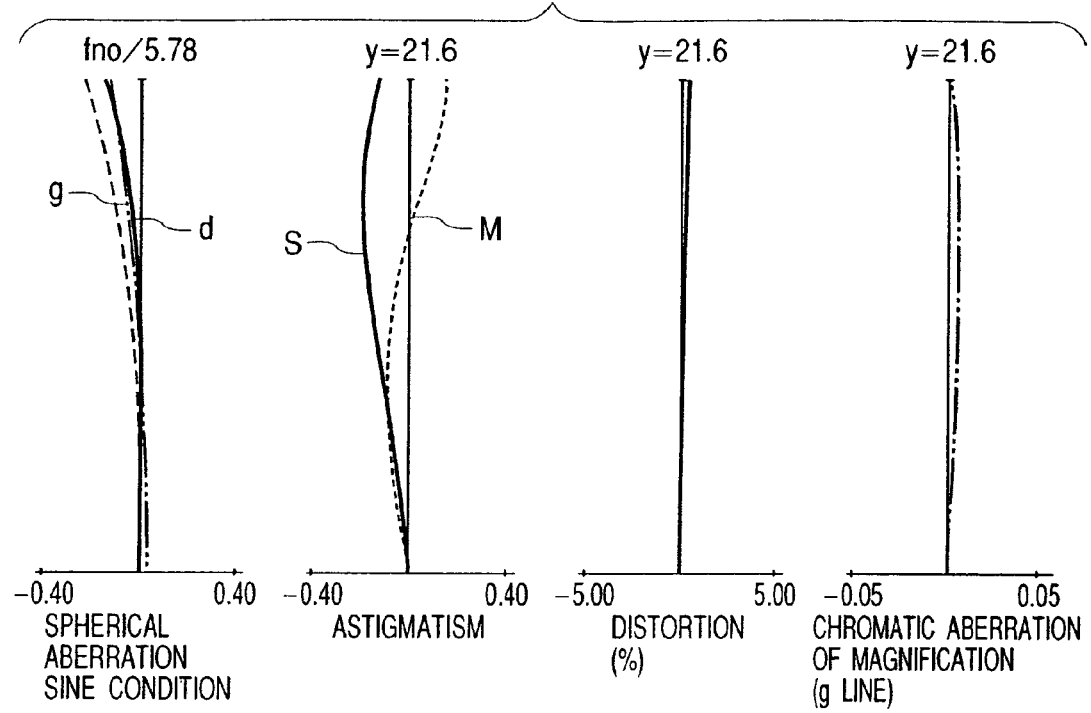
FIG. 5 is lens aberration charts in a photographic state of 1× in the second embodiment of the present invention.
Figure 6:
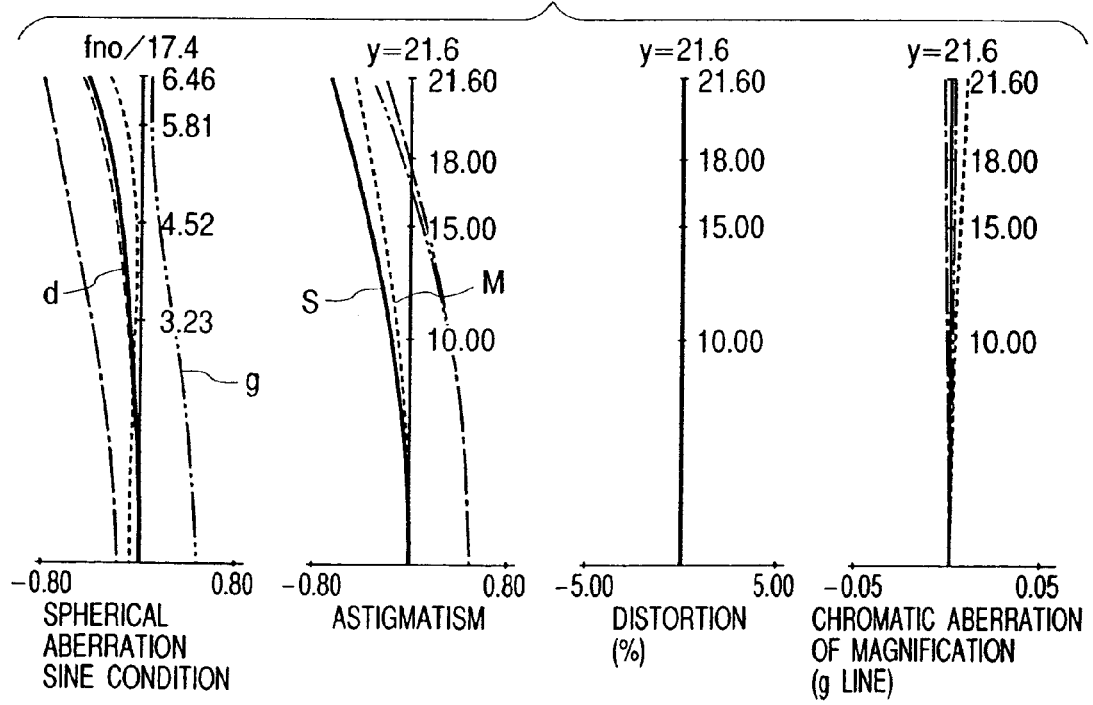
FIG. 6 is lens aberration charts in a photographic state of 5.0× in the second embodiment of the present invention.

FIGS. 4A and 4B are views showing the second embodiment, in which the lens system OL has at least one diffractive optical surface in the lens system, is of a substantially symmetric type consisting of a first lens unit L1 of a positive refracting power, a stop SP, and a second lens unit L2 of a positive refracting power, is arranged to move the entire lens system during focusing, and utilizes floating to change the spaces before and after the stop SP during focusing.

In this second embodiment the first surface is comprised of a diffractive optical surface.

In this second embodiment, the lens system is more preferably constructed to further satisfy at least one of the following conditions.

(2-1) The following condition is preferably satisfied:

$$0.7 < |\Delta s1/\Delta s2| < 1.3 \quad (3),$$

where $\Delta s1$ is a moving distance of the first lens unit in focusing and $\Delta s2$ a moving distance of the second lens unit in focusing.

(2-2) The following conditions are further preferably satisfied:

$$0.7 < f1/f < 1.3 \quad (4), \text{ and}$$

$$1.5 < f2/f < 2.5 \quad (5),$$

where $f1$ is the focal length of the first lens unit, $f2$ the focal length of the second lens unit, and $f$ the focal length of the entire system.

(2-3) When the diffractive optical surface is given by the foregoing Eq (a), it is preferably one satisfying the following conditions:

$$C1 < 0, \text{ and}$$

$$C2 > 0.$$

(2-4) The maximum movement distance of the first lens unit in focusing preferably satisfies the following condition:

$$|\Delta s1/f| > 1.0 \quad (6),$$

where Δs1 is the maximum moving distance of the first lens unit in focusing to the near range and f the focal length of the entire system.

Third Embodiment

Figure 7B:
Figure 8:
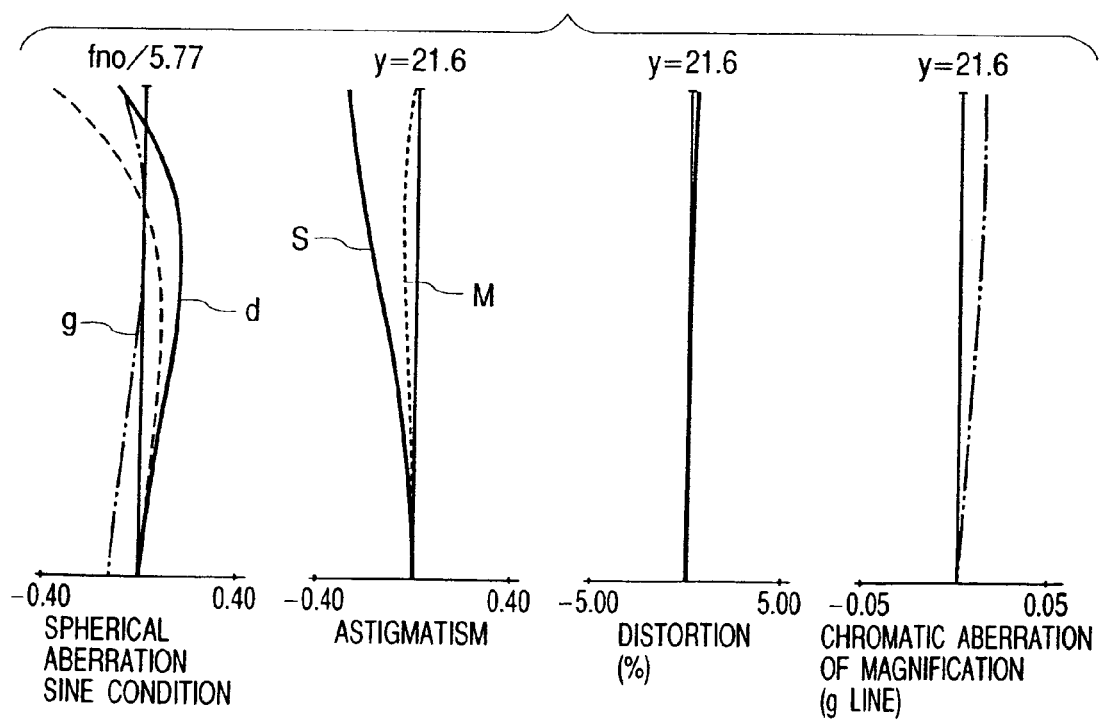
FIG. 8 is lens aberration charts in a photographic state of 1× in the third embodiment of the present invention.
Figure 9:
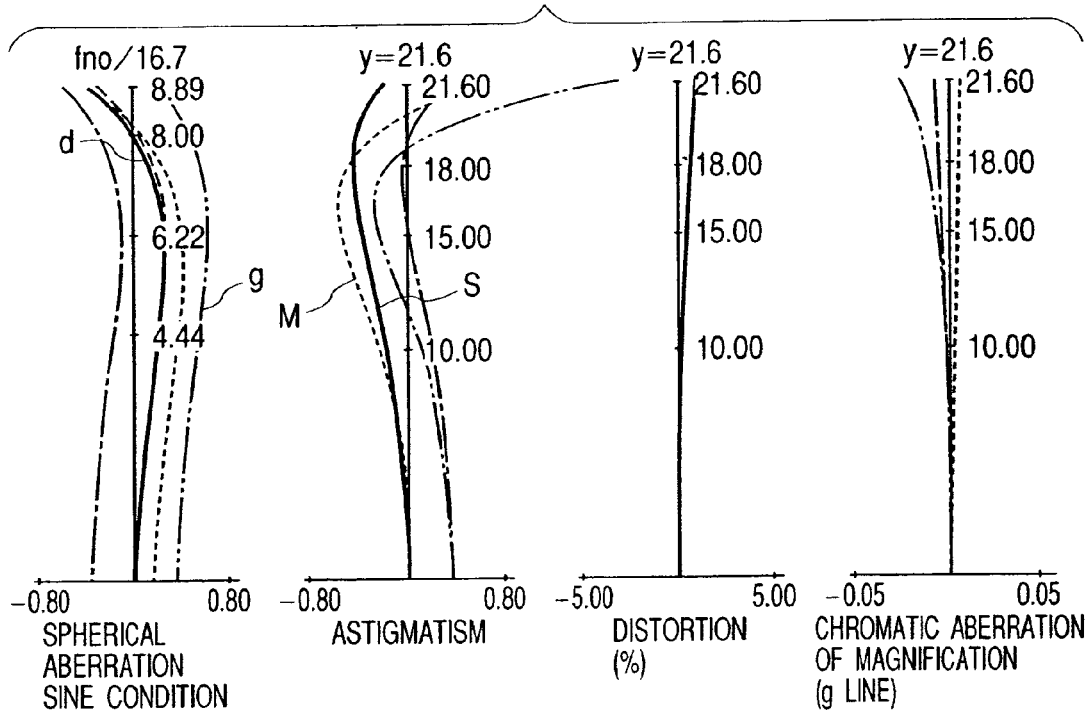
FIG. 9 is lens aberration charts in a photographic state of 5.0× in the third embodiment of the present invention.

FIGS. 7A and 7B are views showing the third embodiment, in which the lens system OL has at least one diffractive optical surface in the lens system, has a first lens unit L1 of a positive refracting power, a second lens unit L2 of a positive refracting power, and a negative lens unit L4 closest to the image plane, in the order (named) from the object side, and is arranged to move the first lens unit and second lens unit toward the object side and increase the air gap on the object side from the negative lens unit during focusing from the infinity object to the near object.

In the present embodiment a third lens unit L3 of a positive refracting power is located on the image plane side of the second lens unit L2.

In this third embodiment the third surface is comprised of a diffractive optical surface.

In the third embodiment the lens system is preferably constructed to satisfy at least one of the following conditions.

(3-1) The following condition is preferably satisfied:

$$0.7 < |\Delta s1/\Delta s2| < 1.3 \quad (7),$$

where Δs1 is a moving distance of the first lens unit in focusing and Δs2 a moving distance of the second lens unit in focusing.

(3-2) The following conditions are also preferably satisfied:

$$0.6 < f1/f < 1.1 \quad (8),$$

$$1.5 < f2/f < 3.5 \quad (9), \text{ and}$$

$$-6.0 < fR/f < -2.0 \quad (10),$$

where f1 is the focal length of the first lens unit, f2 the focal length of the second lens unit, fR the focal length of the negative lens unit closest to the image plane, and f the focal length of the entire system.

(3-3) When the diffractive optical surface is given by the foregoing Eq (a), it is preferably one satisfying the following conditions:

C1<0, and

C2>0.

(3-4) The diffractive optical surface is preferably provided in the first lens unit or in the second lens unit.

(3-5) The negative lens unit closest to the image plane is preferably fixed during focusing.

(3-6) The first lens unit preferably satisfies the following condition:

$$|\Delta s1/f1| > 1.0 \quad (11),$$

where Δs1 is a moving distance of the first lens unit in focusing, and f the focal length of the entire system.

Fourth Embodiment

FIGS. 10A and 10B are views showing the fourth embodiment, in which the lens system has at least one diffractive optical surface in the lens system, has a first lens unit L1 of a positive refracting power and a second lens unit L2 of a negative refracting power in the order (named) from the object side, and is arranged to move the first lens unit toward the object side during focusing from the infinity object to the near object. In the fourth embodiment the eighth surface is comprised of a diffractive optical surface. In the fourth embodiment the lens system is preferably constructed to satisfy at least one of the following conditions.

(4-1) The following conditions are satisfied:

$$0.5 < f1/f < 1.1 \quad (12), \text{ and}$$

$$-2.5 < f2/f < -1.5 \quad (13),$$

where f1 is the focal length of the first lens unit, f2 the focal length of the second lens unit, and f the focal length of the entire system.

(4-2) The diffractive optical surface is preferably provided in the first lens unit.

(4-3) When the diffractive optical surface is given by the foregoing Eq (a), it is preferably one satisfying the following conditions:

C1<1, and

C2>0.

(4-4) The second lens unit is preferably fixed during focusing.

Fifth Embodiment

FIGS. 13A and 13B are views showing the fifth embodiment, in which the lens system has at least one diffractive optical surface in the lens system, has a first lens unit L1 of a positive refracting power and a second lens unit L2 of a positive refracting power in the order (named) from the object side, and is arranged to move the first lens unit toward the object side during focusing from the infinity object to the near object.

In this fifth embodiment the eighth surface is comprised of a diffractive optical surface.

In this fifth embodiment, the lens system is preferably constructed to further satisfy at least one of the following conditions.

(5-1) The following conditions are satisfied:

$$0.7 < f1/f < 1.3 \quad (14), \text{ and}$$

$$f2/f > 10 \quad (15),$$

where f1 is the focal length of the first lens unit, f2 the focal length of the second lens unit, and f the focal length of the entire system.

(5-2) The diffractive optical surface is preferably provided in the first lens unit.

(5-3) When the diffractive optical surface is given by the foregoing Eq (a), it is preferably one satisfying the following conditions:

C1<0, and

C2>0.

(5-4) The second lens unit is preferably fixed during focusing.

Sixth Embodiment

Figure 16B:
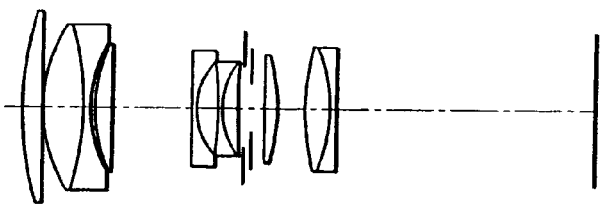
Figure 17:
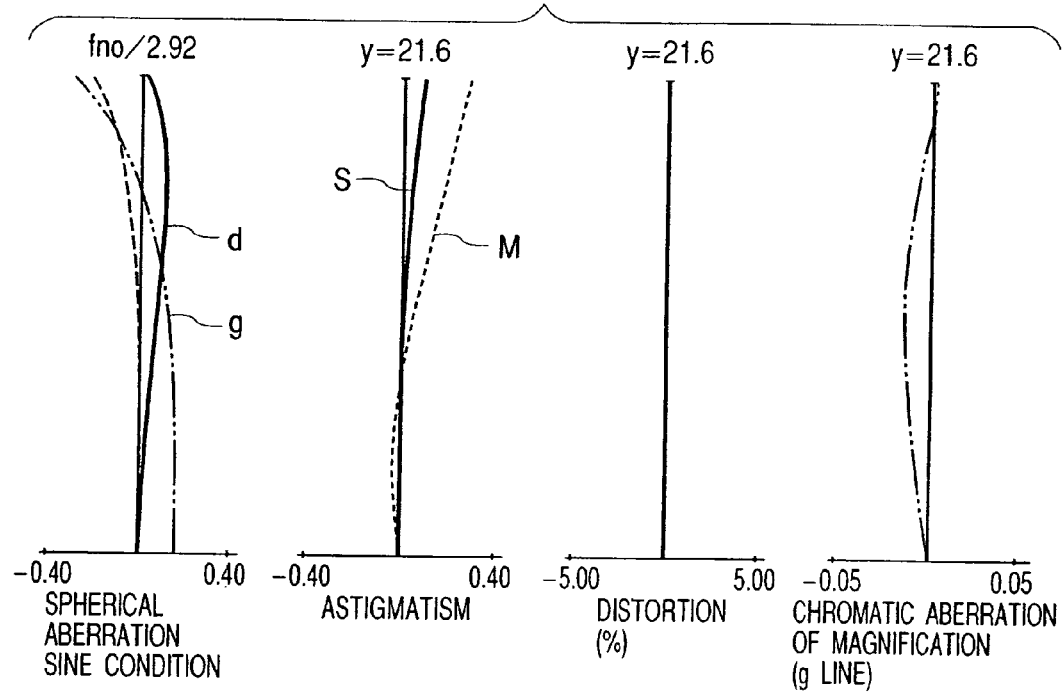
FIG. 17 is lens aberration charts in a photographic state of ∞ in the sixth embodiment of the present invention.
Figure 18:
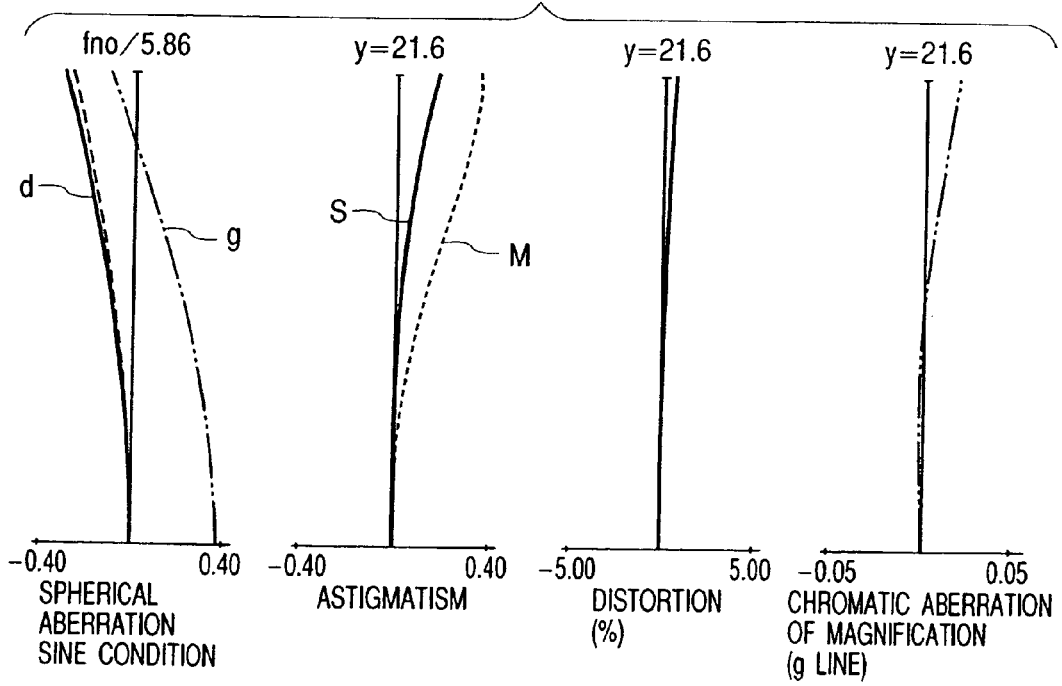
FIG. 18 is lens aberration charts in a photographic state of 1× in the sixth embodiment of the present invention.

FIGS. 16A and 16B are views showing the sixth embodiment, in which the lens system has at least one diffractive optical surface in the lens system, has a first lens unit L1 of a positive refracting power, a second lens unit L2 of a negative refracting power, and a third lens unit L3 of a positive refracting power in the order (named) from the object side, and is arranged to move the second lens unit L2 toward the image side plane and the third lens unit L3 toward the object side with the first lens unit being fixed, during focusing from the infinity object to the near object.

In this sixth embodiment the first surface is comprised of a diffractive optical surface.

In this sixth embodiment, the lens system is preferably constructed to further satisfy at least one of the following conditions.

(6-1) The following condition is satisfied:

$$0.50 < |\Delta s2|/|\Delta s3| < 1.50 \quad (16),$$

where $\Delta s2$ is a moving distance of the second lens unit in focusing and $\Delta s3$ a moving distance of the third lens unit in focusing.

(6-2) The following conditions are more preferably satisfied:

$$0.40 < f1/f < 0.65 \quad (17),$$

$$-0.50 < f2/f < -0.25 \quad (18), \text{ and}$$

$$0.40 < f3/f < 1.10 \quad (19),$$

where f1 is the focal length of the first lens unit, f2 the focal length of the second lens unit, f3 the focal length of the third lens unit, and f the focal length of the entire system.

(6-3) When the diffractive optical surface is given by the foregoing Eq (a), it is preferably one satisfying the following conditions:

C1<0, and

C2>0.

(6-4) The first lens unit preferably has a positive lens at the position closest to the object.

(6-5) The stop is preferably fixed relative to the image plane during focusing and located between the second lens unit and the third lens unit.

(6-6) The lens system is preferably provided with a flare cut stop for cutting detrimental light, which degrades the optical performance in the lens system.

(6-7) The second and third lens units have their respective cemented lenses.

Seventh Embodiment

Figure 19B:
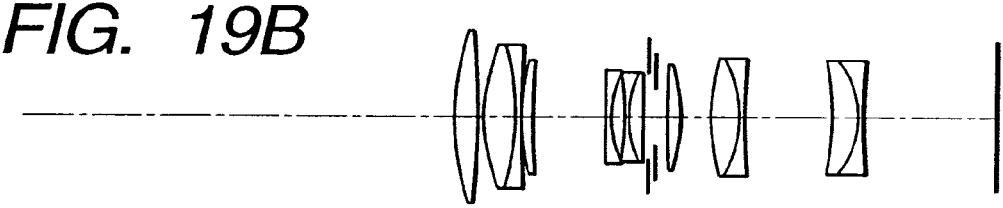
Figure 20:
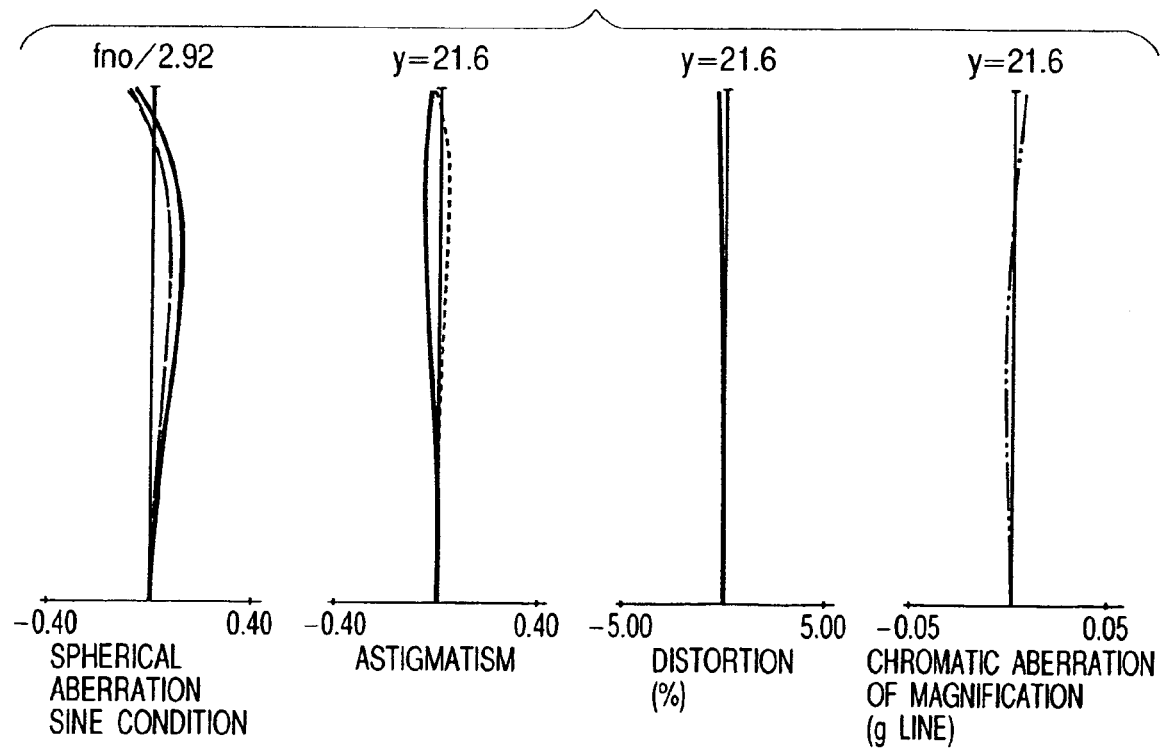
FIG. 20 is lens aberration charts in a photographic state of ∞ in the seventh embodiment of the present invention.
Figure 21:
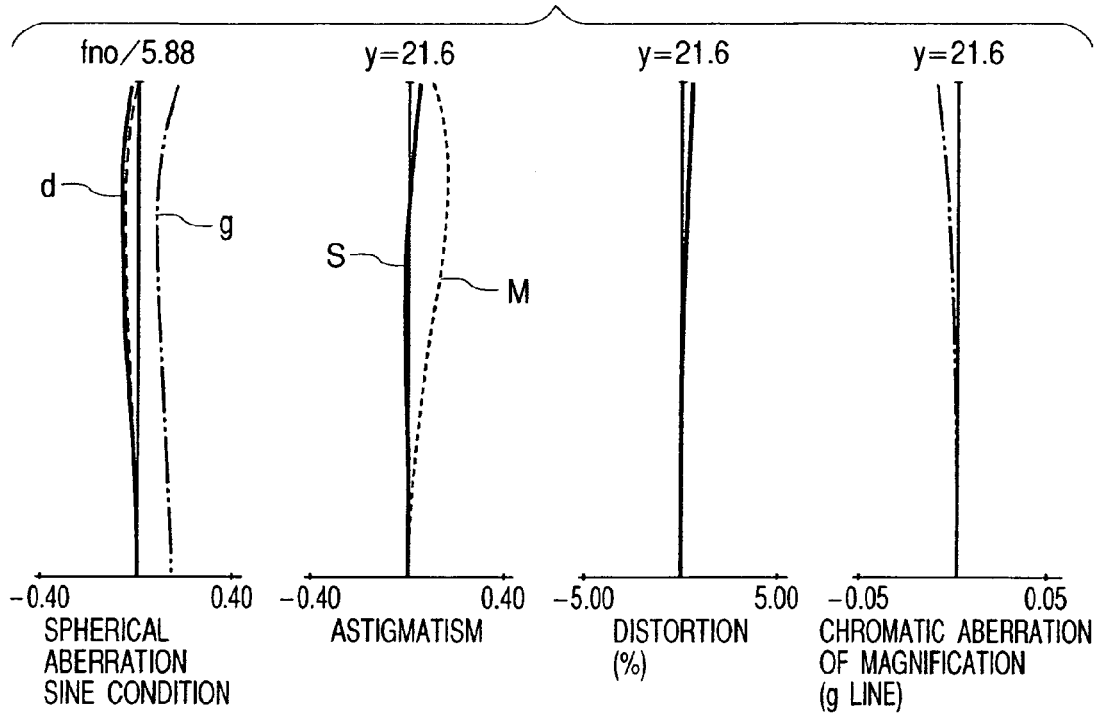
FIG. 21 is lens aberration charts in a photographic state of 1× in the seventh embodiment of the present invention.

FIGS. 19A and 19B are views showing the seventh embodiment, in which the lens system has at least one diffractive optical surface in the lens system, has a first lens unit L1 of a positive refracting power, a second lens unit L2 of a negative refracting power, a third lens unit L3 of a positive refracting power, and a fourth lens unit L4 of a negative refracting power in the order (named) from the object side, and is arranged to move the second lens unit L2 toward the image side plane and the third lens unit L3 toward the object side with first lens being fixed, during focusing from the infinity object to the near object.

In this seventh embodiment the first surface is comprised of a diffractive optical surface.

In this seventh embodiment the lens system is further preferably constructed to satisfy at least one of the following conditions.

(7-1) The following condition is satisfied:

$$0.50 < |\Delta s2|/|\Delta s3| < 1.50 \quad (20),$$

where $\Delta s2$ is a moving distance of the second lens unit in focusing and $\Delta s3$ a moving distance of the third lens unit in focusing.

(7-2) The following conditions are further preferably satisfied:

$$0.40 < f1/f < 0.70 \quad (21),$$

$$-0.45 < f2/f < -0.25 \quad (22),$$

$$0.25 < f3/f < 0.55 \quad (23), \text{ and}$$

$$-1.0 < f4/f < -0.4 \quad (24),$$

where f1 is the focal length of the first lens unit, f2 the focal length of the second lens unit, f3 the focal length of the third lens unit, f4 the focal length of the fourth lens unit, and f the focal length of the entire system.

(7-3) The first lens unit preferably has a positive lens at the position closest to the object.

(7-4) The stop is preferably fixed relative to the image plane during focusing and located between the second lens unit and the third lens unit.

(7-5) The lens system is preferably provided with a flare cut stop for cutting detrimental light, which degrades the optical performance in the lens system.

(7-6) The second and third lens units preferably have their respective cemented lenses.

Eighth Embodiment

Figure 22B:
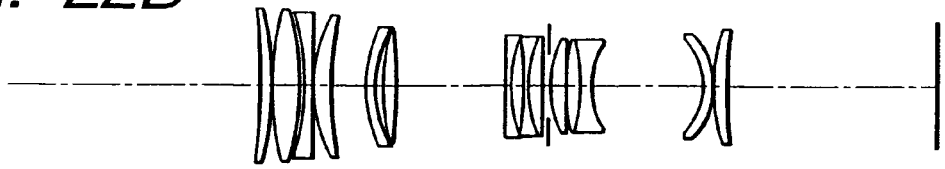
Figure 23:
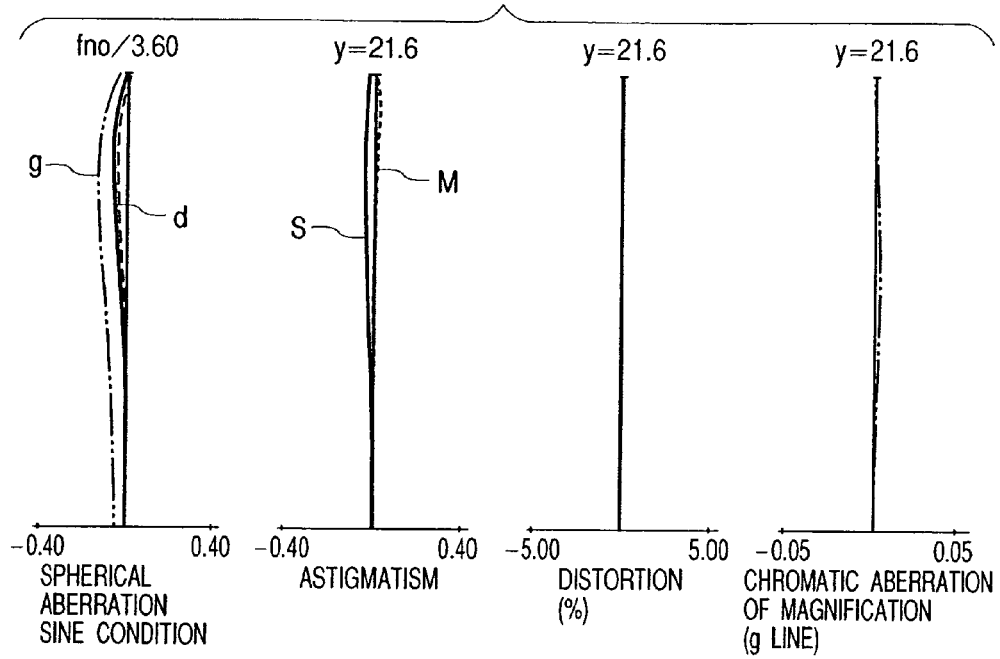
FIG. 23 is lens aberration charts in a photographic state of ∞ in the eighth embodiment of the present invention.
Figure 24:
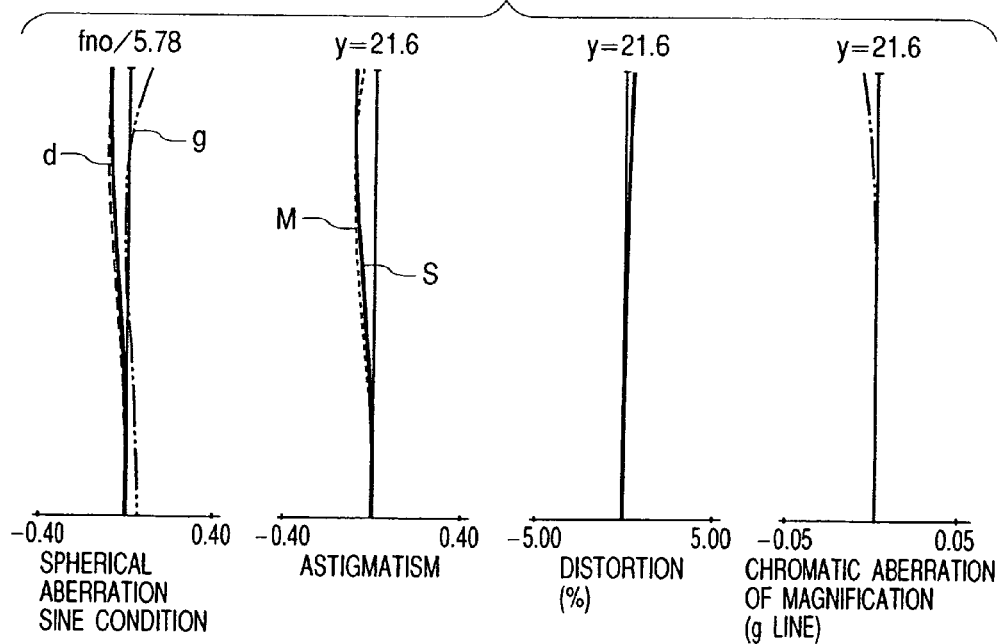
FIG. 24 is lens aberration charts in a photographic state of 1× in the eighth embodiment of the present invention.

FIGS. 22A and 22B are views showing the eighth embodiment, in which the lens system has at least one diffractive optical surface in the lens system, has a first lens unit L1 of a positive refracting power, a second lens unit L2 of a negative refracting power, a third lens unit L3 of a positive refracting power, and a fourth lens unit L4 of a positive refracting power in the order (named) from the object side, and is arranged to move the second lens unit L2 toward the image side plane and the third lens unit L3 toward the object side with the first lens unit being fixed, during focusing from the infinity object to the near object.

In this eighth embodiment the ninth surface is comprised of a diffractive optical surface.

In this eighth embodiment the lens system is further preferably constructed to satisfy at least one of the following conditions.

(8-1) The following condition is satisfied:

$$0.50 < |\Delta s2|/|\Delta s3| < 4.00 \quad (25),$$

where $\Delta s2$ is a moving distance of the second lens unit in focusing and $\Delta s3$ a moving distance of the third lens unit in focusing.

(8-2) The following conditions are also preferably satisfied:

$$0.20 < f1/f < 0.60 \quad (26),$$

$$-0.50 < f2/f < -0.10 \quad (27),$$

$$0.50 < f3/f < 1.50 \quad (28), \text{ and}$$

$$0.70 < f4/f < 1.80 \quad (29),$$

where f1 is the focal length of the first lens unit, f2 the focal length of the second lens unit, f3 the focal length of the third lens unit, f4 the focal length of the fourth lens unit, and f the focal length of the entire system.

(8-3) When the diffractive optical surface is given by the foregoing Eq (a), it is preferably one satisfying the following conditions:

C1<0, and

C2>0.

(8-4) The fourth lens unit is preferably fixed relative to the image plane during focusing.

(8-5) The stop is preferably fixed relative to the image plane during focusing.

(8-6) The lens system is preferably provided with a flare cut stop for cutting the detrimental light, which degrades the performance in the lens system.

The features of the respective embodiments described above and the technical meanings of the conditions will be described below in order.

First Embodiment

The first embodiment of FIGS. 1A and 1B will be described first.

In general, the macrolenses increase their axial chromatic aberration and chromatic aberration of magnification with increase in the photographic magnification. Particularly, concerning the photographic magnification, the use of the diffracting optical element in the range of Eq (1) is significantly effective in correction of chromatic aberration. The upper limit of the photographic magnification $\beta$ is preferably set to approximately $\beta=10$ in terms of correction of aberration.

The conditions of $C1<0$ and $C2>0$ are conditions for well correcting spherical aberration, in which the condition of $C1<0$ means that paraxial refracting powers of the diffraction grating are positive and the condition of $C2>0$ means that positive refracting powers become gradually weaker toward the periphery. Namely, the condition of $C1<0$ is a condition for canceling the axial chromatic aberration and allocating part of the positive refracting power of the entire optical system to the diffractive, optical surface, thereby suppressing occurrence of insufficiently corrected low-order spherical aberration, which the lens units have intrinsically. Then the condition of $C2>0$ is a condition for canceling insufficiently corrected, relatively high-order spherical aberration (ring spherical aberration), which the lens units similarly have intrinsically. The ranges outside these conditions are undesirable, because it becomes infeasible to correct the spherical aberration and axial chromatic aberration well.

The color correction by the diffracting optical element is further effective in the range of Eq (2).

Second Embodiment

The second embodiment of FIGS. 4A and 4B will be described next.

The use of the diffracting optical element facilitates the correction for the axial chromatic aberration and chromatic aberration of magnification during photography at high magnifications and, particularly, coma is effectively corrected by changing the spacing between the focusing units before and after the stop during the focusing to the near object.

The conditions of $C1<0$ and $C2>0$ are conditions for correcting spherical aberration well and the technical meanings described in the first embodiment also apply similarly to the present embodiment.

Condition (3) is a condition concerning the ratio of moving distances of the first lens unit and the second lens unit during focusing. When the ratio of moving distances of the first lens unit and the second lens unit becomes smaller than the lower limit, correction is insufficient for the spherical aberration and it also becomes difficult to correct coma.

When the ratio of moving distances of the first lens unit and the second lens unit becomes larger than the upper limit, the correction of spherical aberration becomes excessive and it also becomes difficult to correct coma.

Condition (4) concerns the refracting power of the first lens unit. When the positive power of the first lens unit becomes stronger in the range below the lower limit, it is advantageous in compactifying the system, but it results in decreasing the lens back, increasing zoom share with change in the photographic magnification, and also increasing magnification change in the subsequent lens unit, thus making aberration correction difficult.

When the power of the first lens unit becomes weaker in the range over the upper limit, the power of each lens unit subsequent thereto also becomes weaker, which is advantageous in correction of aberration, but feed lengths during focusing become larger, which is disadvantageous in compactification.

Condition (5) concerns the power of the second lens unit. When the positive power of the second lens unit becomes stronger in the range below the lower limit, the feed lengths are advantageously decreased, but correction becomes excessive for the spherical aberration and coma produced in the first lens unit.

When the power of the second lens unit becomes weaker in the range over the upper limit, the second lens unit itself produces less aberration but correction becomes insufficient for spherical aberration and coma.

The color correction by the diffracting optical element becomes further effective in the range of Eq (6).

Third Embodiment

The third embodiment of FIGS. 7A and 7B will be described next.

The use of the diffracting optical element facilitates the correction of the axial chromatic aberration and chromatic aberration of magnification during photography at high magnifications. The spacing is increased between the front group of the positive lens units (the first, second, and third lens units) and the rear group of the negative lens unit (the fourth lens unit) during focusing to the near object to increase the power of the entire system, which is advantageous, because the feed lengths can be decreased as compared with the whole system feeding method. Further, the front principal point can be placed closer to the object by the layout of positive and negative refracting powers as a whole, which is also advantageous in ensuring the longer working distance. Changing the spacing between the first lens unit and the second lens unit is effective, particularly, in correction of coma.

The conditions of $C1<0$ and $C2>0$ are conditions for correcting spherical aberration well and the technical meanings described in the first embodiment also apply similarly to the present embodiment.

Condition (7) concerns the ratio of moving distances of the first lens unit and the second lens unit during focusing. When the ratio of moving distances of the first lens unit and the second lens unit becomes smaller than the lower limit, the correction becomes insufficient for the spherical aberration and it also becomes difficult to correct coma.

Condition (8) concerns the power of the first lens unit. When the positive power of the first lens unit becomes stronger in the range below the lower limit, it is advantageous in compactification, but it results in decreasing the back focus, increasing the zoom share with change in the photographic magnification, and also increasing magnification change in the subsequent lens units, thereby making correction of aberration difficult.

When the power of the first lens unit becomes weaker in the range over the upper limit, the powers of the respective lens units subsequent thereto also become weaker, which is advantageous in correction of aberration, but feed lengths during focusing become larger, which is disadvantageous in compactification.

Condition (9) concerns the power of the second lens unit. When the positive power of the second lens unit becomes stronger in the range below the lower limit, it is advantageous in decreasing the feed lengths, but correction becomes excessive for the spherical aberration and coma produced in the first lens unit.

When the power becomes weaker in the range over the upper limit, the second lens unit itself produces less aberration, but correction becomes insufficient for spherical aberration and coma.

Condition (10) concerns the focal length of the negative lens unit closest to the image plane. When the power of the negative lens unit becomes weaker in the range below the lower limit, it is advantageous in correction of aberration, but decrease of the focal length of the entire lens system is small and large feed lengths are thus necessary for yielding high magnifications, which is disadvantageous in compactification.

When the negative power of the negative lens unit becomes stronger in the range over the upper limit, the feed lengths can be small, which is advantageous in compactification, but variations in distortion become larger, image plane characteristics become worse, and the negative lens unit produces worse aberration. Therefore, the lens configuration becomes complex for good aberration correction.

The diffracting optical element is desirably used in the first lens unit or the second lens unit having the large refracting power and large heights of axial rays.

When the negative lens unit closest to the image plane is fixed during focusing, the mechanical structure advantageously becomes simple.

The color correction by the diffracting optical element becomes further effective in the range of Eq (11).

Fourth Embodiment

The fourth embodiment of FIGS. 10A and 10B will be described next.

The use of the diffracting optical element facilitates the correction of axial chromatic aberration and chromatic aberration of magnification during photography at high magnifications. During focusing to the near object the spacing is increased between the front group of the positive lens unit (first lens unit) and the rear group of the negative lens unit (second lens unit) so as to increase the power of the entire system, whereby the feed lengths can be advantageously decreased, as compared with the whole system feeding method. Further, the front principal point can be placed closer to the object by the layout of the positive and negative refracting powers as a whole, which is also advantageous in ensuring the longer working distance.

The conditions of C1<0 and C2>0 are conditions for correcting spherical aberration well, and the technical meanings described in the first embodiment also apply similarly to the present embodiment.

Condition (12) concerns the power of the first lens unit. When the positive power of the first lens unit becomes stronger in the range below the lower limit, it is advantageous in compactification, but it results in decreasing the lens back, increasing the zoom share with change in the photographic magnification, and also increasing the magnification change in the subsequent lens unit, which makes correction of aberration difficult.

When the power of the first lens unit becomes weaker in the range over the upper limit, the power in each lens unit subsequent thereto also becomes weaker, which is advantageous in correction of aberration, but the feed lengths during focusing become larger, which is disadvantageous in compactification.

Condition (13) concerns the focal length of the second lens unit of the negative refracting power. When the power of the negative lens unit becomes weaker in the range below the lower limit, aberration can be advantageously corrected, but the decrease of the focal length of the entire lens system is small and large feed lengths are necessary for obtaining high magnifications, which is disadvantageous in compactification.

When the negative power of the lens unit of the negative refracting power becomes stronger in the range over the upper limit, the feed lengths become small, which is advantageous in compactification, but it results in increasing variations of distortion, degrading the image plane characteristics, and also degrading the aberration produced in the lens unit of the negative refracting power. Therefore, the lens configuration becomes complex for good aberration correction.

The diffracting optical element is desirably used in the first lens unit which has the large refracting power and large heights of axial rays.

Further, when the negative lens unit closest to the image plane is fixed during focusing, the mechanical structure advantageously becomes simple.

Fifth Embodiment

The fifth embodiment of FIGS. 13A and 13B will be described below.

The use of the diffracting optical element facilitates the correction of axial chromatic aberration and chromatic aberration of magnification during photography at high magnifications. During focusing to the near object, the heavy, first lens unit is fixed and the relatively lightweight, second and third lens units are moved, which is advantageous in terms of driving of the lens. The second lens unit is provided with the weak power and used for correction of image plane characteristics, particularly, for correction of coma, thereby yielding good performance.

The conditions of C1<0 and C2>0 are conditions for correcting spherical aberration well and the technical meanings described in the first embodiment also apply similarly to the present embodiment.

Condition (14) concerns the power of the first lens unit. When the positive power of the first lens unit becomes stronger in the range below the lower limit, it is advantageous in compactification, but it results in decreasing the back focus, increasing the zoom share with change in the photographic magnification, and also increasing the magnification change in the subsequent lens unit, which makes correction of aberration difficult.

When the power of the first lens unit becomes weaker in the range over the upper limit, the aberration can be advantageously corrected, but the feed lengths during focusing become larger, which is disadvantageous in compactification.

Condition (15) concerns the focal length of the second lens unit of the positive refracting power. When the power of the second lens unit becomes stronger in the range below the lower limit, the power increase affects the aberrations except coma and does not allow undesirably control of only coma, which is the original purpose.

Sixth Embodiment

The sixth embodiment of FIGS. 16A and 16B will be described below.

The use of the diffracting optical element facilitates the correction of axial chromatic aberration and chromatic aberration of magnification during photography at high magnifications. During the focusing to the near object, the heavy, first lens unit is fixed and the relatively lightweight, second and third lens units are moved, thereby facilitating driving of the lens.

The conditions of C1<0 and C2>0 are conditions for correcting the spherical aberration well and the technical meanings described in the first embodiment also apply similarly to the present embodiment.

Condition (16) concerns the moving distances of the second lens unit and the third lens unit during focusing. When the moving distance of the second lens unit becomes smaller than the moving distance of the third lens unit in the range below the lower limit, the power of the second lens unit has to be increased, so as to strengthen diverging components and the diameter of the third lens unit has to be increased in order to obtain sufficient quantity of light in the marginal region of the photographic plane because of the large moving distance of the third lens unit. When the moving distance of the second lens unit becomes larger than the moving distance of the third lens unit in the range over the upper limit, the power of the third lens unit increases while the power of the second lens unit decreases, which makes it difficult to cancel the aberration produced in the second lens unit and in the third lens unit.

Condition (17) concerns the power of the first lens unit. In the range below the lower limit the power of the first lens unit becomes stronger, which is advantageous in compactification, but it becomes difficult to well correct variations in spherical aberration during photography of near object. In the range over the upper limit on the other hand, aberration can be advantageously corrected, but it is difficult to realize compactification.

Condition (18) concerns the power of the second lens unit. In the range below the lower limit the power of the second lens unit becomes stronger and the moving distance can be decreased during focusing. However, rays having passed through the second lens unit tend to have stronger diverging action and thus the third lens unit needs to have a large diameter, which is disadvantageous for autofocusing. Since the second unit itself increases aberration, it becomes difficult to correct the aberration variations during focusing. In the range over the upper limit on the other hand, the aberration can be advantageously corrected, but the moving distance during focusing increases, and it becomes difficult to yield high photographic magnifications.

Condition (19) concerns the power of the third lens unit. When the power of the third lens unit becomes stronger in the range below the lower limit, it is advantageous in terms of the moving distance during focusing, but it is necessary to enhance the diverging action of the second lens unit for correction of aberration, which increases the diameter of the third lens unit. When the power of the third lens unit becomes weaker in the range over the upper limit, the negative power of the second lens unit also needs to be weakened for correction of aberration and the second and third lens units both require a large moving space in order to obtain high photographic magnifications.

In addition, the position of the principal point can be set closer to the object by provision of the positive lens closest to the object in the first lens unit, which can ensure the longer working distance.

When the stop is fixed relative to the image plane during focusing, the mechanical structure becomes simple. When the stop is located midway between the second lens unit and the third lens unit, it is feasible to ensure the sufficient quantity of light during photography at the magnification of 1× and realize a bright taking lens in compact structure and with a small aperture ratio.

It is also desirable to cut off-axis rays, which cause degradation of optical performance, by the flare cut stop.

Cemented surfaces of the cemented lenses in the second and third lens units can control absolute values of chromatic aberrations of the respective units themselves to a small level and correct well the aberration variations during focusing.

Seventh Embodiment

The seventh embodiment of FIGS. 19A and 19B will be described below.

The use of the diffracting optical element facilitates the correction of axial chromatic aberration and chromatic aberration of magnification during photography at high magnifications. During the focusing to the near object, the moving second lens unit is moved toward the image side plane, the third lens unit toward the object side, and the fourth lens unit toward the object side so as to include a convex locus, thereby mainly contributing to correction of image plane.

The conditions of C1<0 and C2>0 are conditions for correcting spherical aberration well and the technical meanings described in the first embodiment also apply similarly to the present embodiment.

Condition (20) concerns the moving distances of the second lens unit and the third lens unit during focusing. When in the range below the lower limit the moving distance of the second lens unit becomes smaller than the moving distance of the third lens unit, the power of the second lens unit has to be increased, so as to strengthen the diverging components, and the diameter of the third lens unit has to be increased in order to obtain the sufficient quantity of light in the marginal region of the photographic plane because of the large moving distance of the third lens unit. When in the range over the upper limit the moving distance of the second lens unit becomes larger than that of the third lens unit, the power of the third lens unit increases while the power of the second lens unit decreases, which makes it difficult to cancel the aberration produced in the second lens unit and in the third lens unit.

Condition (21) concerns the power of the first lens unit. In the range below the lower limit the power of the first lens unit becomes stronger, which is advantageous in compactification, but it becomes difficult to correct well variations in spherical aberration during photography of near object. In the range over the upper limit on the other hand, aberration can be advantageously corrected, but it is difficult to realize compactification.

Condition (22) concerns the power of the second lens unit. In the range below the lower limit the power of the second lens unit becomes stronger and the moving distance can be decreased during focusing. However, rays having passed through the second lens unit tend to have stronger diverging action and thus the third lens unit needs to have a large diameter, which is disadvantageous for autofocusing. Since the second unit itself increases aberration, it becomes difficult to correct the aberration variations during focusing. In the range over the upper limit on the other hand, the aberration can be advantageously corrected, but the moving distance during focusing increases, and it becomes difficult to yield high photographic magnifications.

Condition (23) concerns the power of the third lens unit. When the power of the third lens unit becomes stronger in the range below the lower limit, it is advantageous in terms of the moving distance during focusing, but it is necessary to enhance the diverging action of the second lens unit for correction of aberration, and the diameter of the third lens unit becomes larger. When the power of the third lens unit becomes weaker in the range over the upper limit, the negative power of the second lens unit also needs to be weakened for correction of aberration and the second and third lens units both require a large moving space in order to obtain high photographic magnifications.

Condition (24) concerns the power of the fourth lens unit. When the power of the fourth lens unit becomes weaker in the range below the lower limit, the moving distance necessary for correction of image plane becomes larger and the entire lens length becomes larger, which is disadvantageous in compactification. When the power of the fourth lens unit becomes stronger in the range over the upper limit, it is advantageous in the aspect of moving space, but the fourth unit itself produces more aberration, which is not easy to correct.

In addition, the position of the principal point can be set closer to the object by provision of the positive lens closest to the object in the first lens unit, which can ensure the longer working distance.

When the stop is fixed relative to the image plane during focusing, the mechanical structure becomes simple. When the stop is located midway between the second lens unit and the third lens unit, it is feasible to ensure the sufficient quantity of light during photography at the magnification of 1× and realize a bright taking lens in compact structure and with a small aperture ratio.

It is also desirable to cut the off-axis rays, which cause degradation of optical performance, by the flare cut stop.

Cemented surfaces of the cemented lenses in the second and third lens units can control absolute values of chromatic aberrations of the respective units themselves to a small level and correct well the aberration variations during focusing.

Eighth Embodiment

The eighth embodiment of FIGS. 22A and 22B will be described below.

The use of the diffracting optical element facilitates the correction of axial chromatic aberration and chromatic aberration of magnification during photography at high magnifications. During focusing to the near object, the second lens unit moves toward the image side plane and the third lens unit toward the object side.

The conditions of C1<0 and C2>0 are conditions for correcting spherical aberration well and the technical meanings described in the first embodiment also apply similarly to the present embodiment.

Condition (25) concerns the moving distances of the second lens unit and the third lens unit during focusing. When in the range below the lower limit the moving distance of the second lens unit becomes smaller than the moving distance of the third lens unit, the power of the second lens unit has to be increased, so as to strengthen the diverging components, and the diameter of the third lens unit has to be increased in order to obtain the sufficient quantity of light in the marginal region of the photographic plane because of the large moving distance of the third lens unit. When in the range over the upper limit the moving distance of the second lens unit becomes larger than that of the third lens unit, the power of the third lens unit increases while the power of the second lens unit decreases, which makes it difficult to cancel the aberration produced in the second lens unit and in the third lens unit.

Condition (26) concerns the power of the first lens unit. In the range below the lower limit the power of the first lens unit becomes stronger, which is advantageous in compactification, but it becomes difficult to correct well variations in spherical aberration during photography of near object. In the range over the upper limit on the other hand, aberration can be advantageously corrected, but it is difficult to realize compactification.

Condition (27) concerns the power of the second lens unit. In the range below the lower limit the power of the second lens unit becomes stronger and the moving distance can be decreased during focusing. However, rays having passed through the second lens unit tend to have stronger diverging action and thus the third lens unit needs to have a larger diameter, which is disadvantageous for autofocusing. Since the second unit itself increases aberration, it becomes difficult to correct the aberration variations during focusing. In the range over the upper limit on the other hand, the aberration can be advantageously corrected, but the moving distance during focusing increases, and it becomes difficult to yield high photographic magnifications.

Condition (28) concerns the power of the third lens unit. When the power of the third lens unit becomes stronger in the range below the lower limit, it is advantageous in terms of the moving distance during focusing, but it is necessary to enhance the diverging action of the second lens unit for correction of aberration, which increase the diameter of the third lens unit. When the power of the third lens unit becomes weaker in the range over the upper limit, the negative power of the second lens unit also needs to be weakened for correction of aberration and the second and third lens units both require a large moving space in order to obtain high photographic magnifications.

Condition (29) concerns the power of the fourth lens unit. When the power of the fourth lens unit becomes stronger in the range below the lower limit, it is advantageous in terms of the moving space, but the fourth lens unit itself produces more aberration, which is not easy to correct. When the power of the fourth lens unit becomes weaker in the range over the upper limit, it becomes necessary to increase the photographic magnifications of the other lens units in order to obtain high photographic magnifications, and it becomes difficult to correct aberration.

When the stop is fixed relative to the image plane during focusing, the mechanical structure becomes simple. When the stop is located midway between the second lens unit and the third lens unit, it is feasible to ensure the sufficient quantity of light during photography at the magnification of 1× and realize a bright taking lens in compact structure and with a small aperture ratio.

It is also desirable to cut the off-axis rays, which cause degradation of optical performance, by the flare cut stop.

Cemented surfaces of the cemented lenses in the second and third lens units can control absolute values of chromatic aberrations of the respective units themselves to a small level and correct well the aberration variations during focusing.

Figure 25:
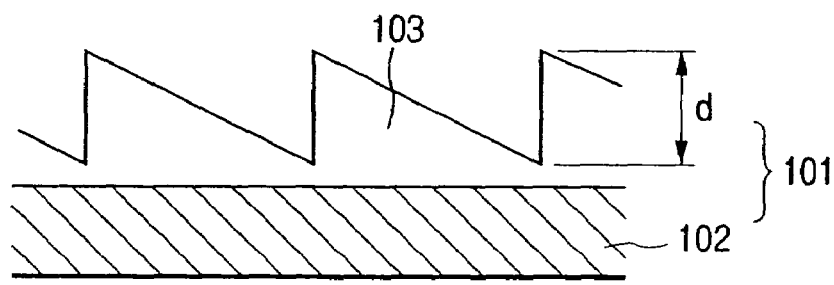
FIG. 25 is an explanatory drawing to illustrate a diffracting optical element according to the present invention.
Figure 27:
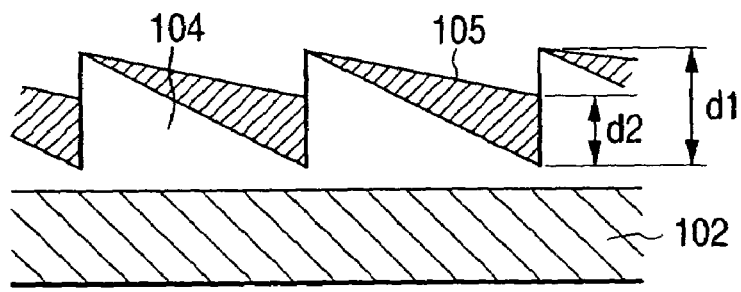
FIG. 27 is an explanatory drawing to illustrate another diffracting optical element according to the present invention.

Applicable configurations of the diffracting optical element used in the embodiments include a one-layer structure consisting of one layer of the kinoform shape illustrated in FIG. 25, a two-layer structure consisting of a stack of two layers with different (or equal) grating thicknesses as illustrated in FIG. 27, and so on.

Figure 26:
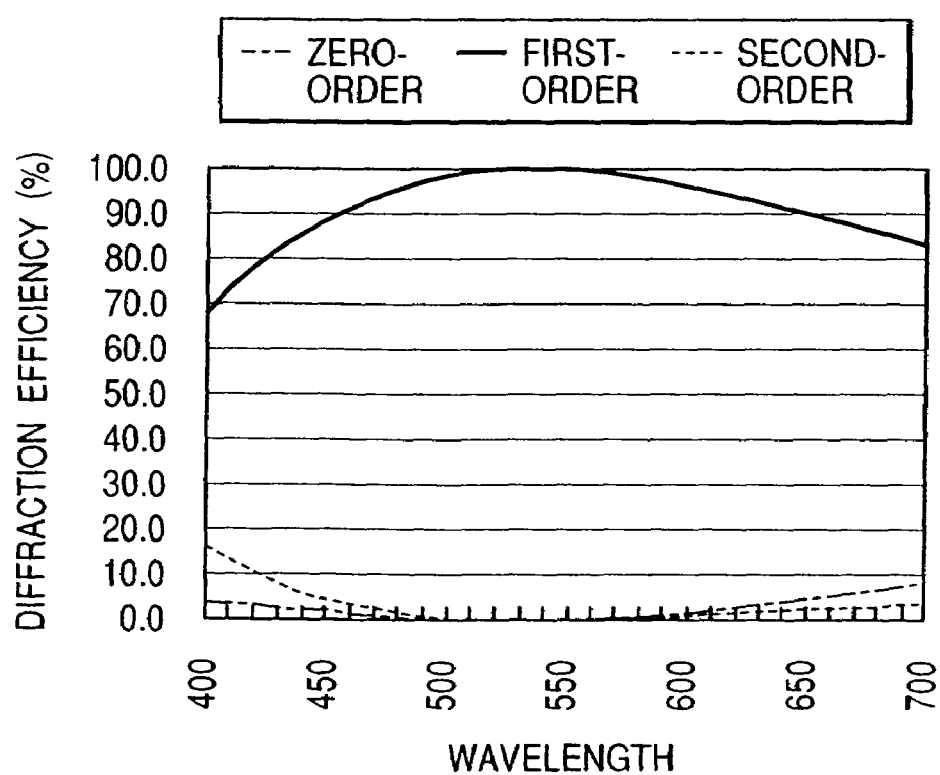
FIG. 26 is an explanatory drawing to show wavelength dependence characteristics of the diffracting optical element according to the present invention.

FIG. 26 shows the wavelength dependence characteristics of diffraction efficiency of the first-order diffracted light from the diffracting optical element 101 shown in FIG. 25. The actual diffracting optical element 101 is constructed by coating the surface of substrate 102 with an ultraviolet-curing resin and forming a diffraction grating 103 in a grating thickness d in the resin part so that the diffraction efficiency of the first-order diffracted light becomes 100% at the wavelength of 530 nm.

As apparent from FIG. 26, the diffraction efficiency of the designed order decreases as the wavelength becomes apart from 530 nm. On the other hand, the diffraction efficiency increases in the zero-order and second-order diffracted light in the orders near the designed order. The increase of the diffracted light except for the designed order results in flare and degradation of the resolution of the optical system eventually.

Figure 28:
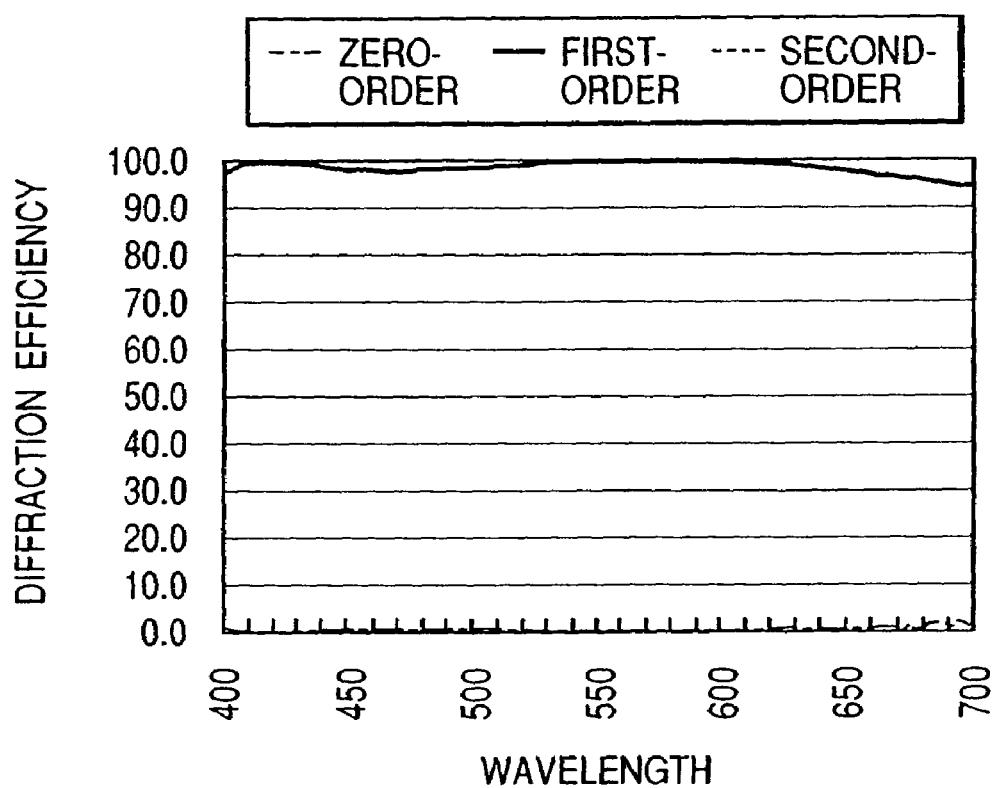
FIG. 28 is an explanatory drawing to show wavelength dependence characteristics of the diffracting optical element according to the present invention.

FIG. 28 shows the wavelength dependence characteristics of diffraction efficiency of the first-order diffracted light from the stack type diffracting optical element consisting of a stack of two diffraction gratings 104, 105 illustrated in FIG. 27.

In FIG. 27 a first diffraction grating 104 of an ultraviolet-curing resin (nd=1.499, vd=54) is formed on the substrate 102 and a second diffraction grating 105 of another ultraviolet-curing resin (nd=1.598, vd=28) thereon. In this combination of materials, the grating thickness d1 of the first diffraction grating 104 is set to d1=13.8 μm and the grating thickness d2 of the second diffraction grating 105 to d2=10.5 μm.

As seen from FIG. 28, when the diffracting optical element is constructed in the stack structure, the diffraction efficiency of the designed order is as high as 95% or more across the entire working wavelength region.

Figure 29:
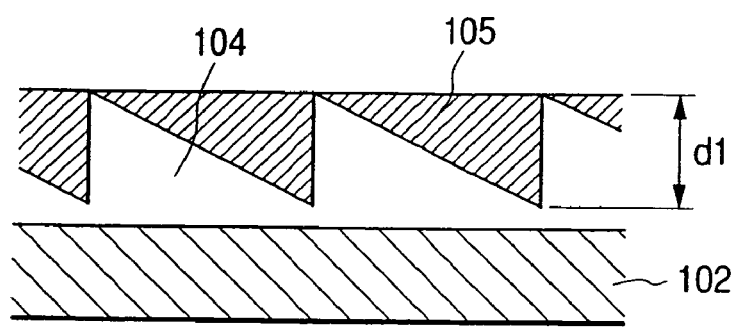
FIG. 29 is an explanatory drawing to illustrate still another diffracting optical element according to the present invention.

Materials for the foregoing diffracting optical elements of the stack structure are not limited to the ultraviolet-curing resins, but other plastic materials can also be used. Depending upon the substrate, the first diffraction grating 104 may be formed directly on the substrate. The grating thicknesses of the respective gratings do not always have to be different from each other, and the grating thicknesses of the two diffraction gratings 104 and 105 can be made equal to each other, depending upon the combination of materials, as shown in FIG. 29.

In this case, since no grating shape is formed in the surface of the diffracting optical element, it is excellent in dust proofing and it can improve the assembly workability of the diffracting optical element.

Next, an embodiment of an optical device using a lens system of the present invention will be described referring to FIG. 30.

Figure 30:
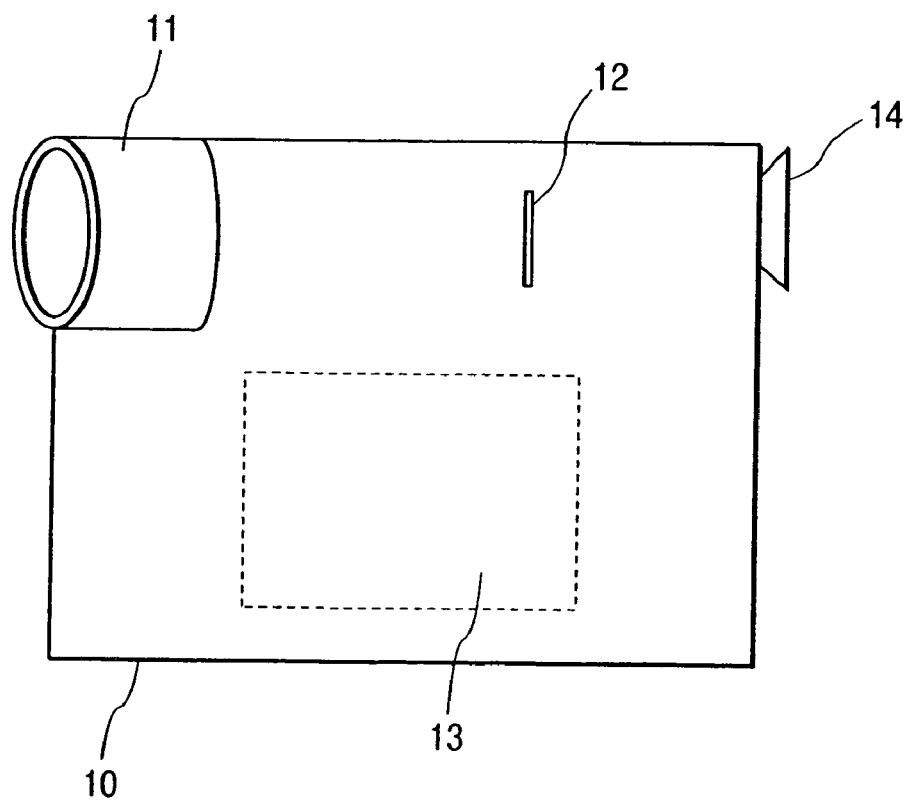
FIG. 30 is a schematic view to show the major part of an optical device according to the present invention.

In FIG. 30, reference numeral 10 designates the main body of camera, 11 the lens system of the present invention, 12 an image pickup device such as CCD or the like for receiving an image of subject through the lens system 11, 13 a recording means for recording the subject image received by the image pickup device 12, and 14 a finder for observing the subject image displayed on an unrepresented display device. The display device is constructed of a liquid crystal panel or the like and the subject image formed on the image pickup device 12 is displayed thereon.

As described above, the lens system of the present invention is applied to the optical device such as the video camera or the like, thereby realizing the compact optical device with high optical performance.

Numerical embodiments of the present invention will be presented below. In the numerical embodiments ri represents the radius of curvature of the ith lens surface when counted in order from the object side, di the spacing between the ith surface and the (i+1)th surface when counted in order from the object side, and ni and vi the refractive index and Abbe's number, respectively, of glass of the ith optical member when counted in order from the object side.

Table 1 presents relations between the foregoing conditions and the numerical embodiments.

Further, the phase coefficients C1, C2, C3 of the diffraction grating, represented by Eq (a), are also presented.

Here f, fno, and 2ω indicate the focal length of the entire system in focus on the object at infinity, the F-number, and the angle of view, respectively. The wavelength λ is set to 587.6 nm (d-line).

First Numerical Enbodiment

| f = 34.73836 fno = 1:2.90 | | | | |
|---|---|---|---|---|
| r1 = 19.963 | diffraction surface | d1 = 2.47 | n1 = 1.77250 | v1 = 49.6 |
| r2 = 76.991 | | d2 = 0.10 | | |
| r3 = 12.335 | | d3 = 3.40 | n2 = 1.74950 | v2 = 35.3 |
| r4 = −346.452 | | d4 = 1.80 | n3 = 1.76182 | v3 = 26.5 |
| r5 = 9.016 | | d5 = 3.72 | | |
| r6 = 0.000 | aperture | d6 = 4.82 | | |
| r7 = −9.410 | | d7 = 1.00 | n4 = 1.74950 | v4 = 35.3 |
| r8 = 608.440 | | d8 = 2.16 | n5 = 1.60342 | v5 = 38.0 |
| r9 = −12.430 | | d9 = 0.10 | | |
| r10 = −389.588 | | d10 = 1.58 | n6 = 1.83481 | v6 = 42.7 |
| r11 = −26.840 | | | | |

$C_1 = -4.29790 \times 10^{-4}$
$C_2 = 2.33200 \times 10^{-6}$
$C_3 = 2.65280 \times 10^{-8}$ Second Numerical Enbodiment

| f = 35.49980 fno = 1:2.89 | | | | |
|---|---|---|---|---|
| r1 = 27.173 | diffraction surface | d1 = 1.50 | n1 = 1.83481 | v1 = 42.7 |
| r2 = 85.947 | | d2 = 0.10 | | |
| r3 = 12.208 | | d3 = 1.82 | n2 = 1.83481 | v2 = 42.7 |
| r4 = 37.535 | | d4 = 3.02 | n3 = 1.72825 | v3 = 28.5 |
| r5 = 9.009 | | d5 = 2.67 | | |
| r6 = 0.000 | aperture | d6 = changeable | | |
| r7 = −9.457 | | d7 = 0.95 | n4 = 1.70154 | v4 = 41.2 |
| r8 = −110.551 | | d8 = 2.48 | n5 = 1.48749 | v5 = 70.2 |
| r9 = −11.716 | | d9 = 0.10 | | |

-continued f = 35.49980 fno = 1:2.89

| | | | |
|---|---|---|---|
| r10 = −190.444 | d10 = 2.00 | n6 = 1.83481 | v6 = 42.7 |
| r11 = −22.871 | | | |

| focal length changeable distance | 35.50 | 34.45 | 34.09 |
|---|---|---|---|
| d6 | 7.34 | 5.17 | 4.40 |

$C_1 = -4.40490 \times 10^{-4}$
$C_2 = 2.05200 \times 10^{-6}$
$C_3 = -2.89490 \times 10^{-8}$

Third Numerical Enbodiment f = 62.23951 fno = 1:2.89

| | | | |
|---|---|---|---|
| r1 = 27.396 | diffraction surface d1 = 4.11 | n1 = 1.74950 | v1 = 35.3 |
| r2 = −1624.249 | d2 = 0.15 | | |
| r3 = 23.335 | d3 = 3.88 | n2 = 1.48749 | v2 = 70.2 |
| r4 = −97.857 | d4 = 2.31 | n3 = 1.58144 | v3 = 40.8 |
| r5 = 15.382 | d5 = 3.15 | | |
| r6 = 0.000 aperture | d6 = changeable | | |
| r7 = −15.645 | d7 = 4.41 | n4 = 1.72151 | v4 = 29.2 |
| r8 = 246.091 | d8 = 3.58 | n5 = 1.48749 | v5 = 70.2 |
| r9 = −20.794 | d9 = 0.15 | | |
| r10 = 2069.848 | d10 = 5.20 | n6 = 1.74950 | v6 = 35.3 |
| r11 = −39.113 | d11 = changeable | | |
| r12 = 626.291 | d12 = 3.76 | n7 = 1.60311 | v7 = 60.6 |
| r13 = −149.414 | d13 = changeable | | |
| r14 = −31.407 | d14 = 2.81 | n8 = 1.80400 | v8 = 46.6 |
| r15 = −29.046 | d15 = 3.64 | | |
| r16 = −44.675 | d16 = 2.03 | n9 = 1.58144 | v9 = 40.8 |
| r17 = 44.675 | d17 = 6.08 | | |
| r18 = 69.611 | d18 = 5.51 | n10 = 1.74950 | v10 = 35.3 |
| r19 = −122.794 | | | |

| focal length changeable distance | 62.24 | 38.40 | 47.48 |
|---|---|---|---|
| d6 | 6.54 | 2.64 | 4.53 |
| d11 | 2.07 | 5.96 | 4.08 |
| d13 | 3.57 | 132.48 | 68.95 |

$C_1 = -2.47800 \times 10^{-4}$
$C_2 = 1.91620 \times 10^{-7}$
$C_3 = -5.36610 \times 10^{-9}$

Fourth Numerical Enbodiment f = 99.27126 fno = 1:2.89 2w = 24.2°

| | | | |
|---|---|---|---|
| r1 = 74.700 | d1 = 4.20 | n1 = 1.71300 | v1 = 53.9 |
| r2 = 167.876 | d2 = 0.10 | | |
| r3 = 60.406 | d3 = 4.20 | n2 = 1.83481 | v2 = 42.7 |
| r4 = 90.573 | d4 = 9.63 | | |
| r5 = 85.823 | d5 = 6.31 | n3 = 1.83400 | v3 = 37.2 |
| r6 = −4510.219 | d6 = 0.74 | | |
| r7 = −121.466 | d7 = 1.80 | n4 = 1.78472 | v4 = 25.7 |

-continued f = 99.27126 fno = 1:2.89 2w = 24.2°

| | | | |
|---|---|---|---|
| r8 = 54.598 | diffraction surface d8 = 3.56 | | |
| r9 = 0.000 aperture | d9 = 3.54 | | |
| r10 = −56.200 | d10 = 1.80 | n5 = 1.60342 | v5 = 38.0 |
| r11 = −581.487 | d11 = 4.50 | n6 = 1.83481 | v6 = 42.7 |
| r12 = −60.821 | d12 = 1.80 | | |
| r13 = 348.604 | d13 = 4.00 | n7 = 1.83400 | v7 = 37.2 |
| r14 = −114.818 | d14 = changeable | | |
| r15 = 50.780 | d15 = 4.00 | n8 = 1.83481 | v8 = 42.7 |
| r16 = −239.199 | d16 = 0.10 | | |
| r17 = −248.580 | d17 = 3.00 | n9 = 1.77250 | v9 = 49.6 |
| r18 = 30.282 | d18 = 14.72 | | |
| r19 = 31.589 | d19 = 4.00 | n10 = 1.48749 | v10 = 70.2 |
| r20 = 35.273 | | | |

| focal length changeable distance | 99.27 | 82.54 | 70.64 |
|---|---|---|---|
| d14 | 1.34 | 34.44 | 67.54 |

$C_1 = -2.64080 \times 10^{-4}$
$C_2 = 3.91710 \times 10^{-7}$
$C_3 = -5.60150 \times 10^{-10}$

Fifth Numerical Enbodiment f = 50.99860 fno = 1:2.54 2w = 46.2°

| | | | |
|---|---|---|---|
| r1 = 63.795 | d1 = 2.46 | n1 = 1.83481 | v1 = 42.7 |
| r2 = −729.779 | d2 = 0.10 | | |
| r3 = 25.603 | d3 = 2.48 | n2 = 1.83400 | v2 = 37.2 |
| r4 = 42.873 | d4 = 0.54 | | |
| r5 = 91.192 | d5 = 1.60 | n3 = 1.58144 | v3 = 40.8 |
| r6 = 19.075 | d6 = 4.01 | | |
| r7 = 0.000 | diffraction surface d7 = 5.35 | | |
| r8 = −32.043 aperture | d8 = 4.02 | n4 = 1.84666 | v4 = 23.8 |
| r9 = −28.091 | d9 = 1.83 | | |
| r10 = −16.673 | d10 = 1.99 | n5 = 1.76182 | v5 = 26.5 |
| r11 = −229.644 | d11 = 5.21 | n6 = 1.83481 | v6 = 42.7 |
| r12 = −25.272 | d12 = 0.10 | | |
| r13 = −88.671 | d13 = 4.04 | n7 = 1.77250 | v7 = 49.6 |
| r14 = −32.149 | d14 = changeable | | |
| r15 = 62.857 | d15 = 1.60 | n8 = 1.66672 | v8 = 48.3 |
| r16 = 41.955 | d16 = 1.78 | | |
| r17 = 102.154 | d17 = 2.81 | n9 = 1.58144 | v9 = 40.8 |
| r18 = −3539.971 | | | |

| focal length changeable distnce | 51.00 | 51.99 | 51.25 |
|---|---|---|---|
| d14 | 0.10 | 27.33 | 7.00 |

$C_1 = -5.36620 \times 10^{-4}$
$C_2 = 1.8219 \times 10^{-6}$
$C_3 = -1.16900 \times 10^{-8}$

Sixth Numerical Enbodiment

| | | f = 97.17317 fno = 1:2.92 2w = 25.1° | | |
|---|---|---|---|---|
| r1 = 97.364 | diffraction surface | d1 = 5.58 | n1 = 1.77250 | v1 = 49.6 |
| r2 = −874.343 | | d2 = 0.15 | | |
| r3 = 45.893 | | d3 = 11.14 | n2 = 1.60311 | v2 = 60.6 |
| r4 = −78.345 | | d4 = 1.85 | n3 = 1.69895 | v3 = 30.1 |
| r5 = 39.713 | | d5 = 1.23 | | |
| r6 = 53.194 | | d6 = 4.46 | n4 = 1.88300 | v4 = 40.8 |
| r7 = 3001.149 | | d7 = changeable | | |
| r8 = −9270.720 | | d8 = 1.40 | n5 = 1.60311 | v5 = 60.6 |
| r9 = 19.633 | | d9 = 5.95 | | |
| r10 = −103.710 | | d10 = 1.40 | n6 = 1.48749 | v6 = 70.2 |
| r11 = 21.843 | | d11 = 4.28 | n7 = 1.83400 | v7 = 37.2 |
| r12 = 95.936 | | d12 = changeable | | |
| r13 = 0.000 | aperture | d13 = 2.00 | | |
| | | d13 = changeable | | |
| r14 = | | d14 = 3.89 | n8 = 1.48749 | v8 = 70.2 |
| r15 = −45.107 | | d15 = 7.93 | | |
| r16 = 67.660 | | d16 = 6.90 | n9 = 1.48749 | v9 = 70.2 |
| r17 = −48.739 | | d17 = 1.60 | n10 = 1.69895 | v10 = 30.1 |
| r18 = −644.867 | | | | |

| focal length changeable distance | 97.17 | 100.25 | 81.21 | 100.60 |
|---|---|---|---|---|
| d7 | 1.35 | 11.39 | 22.39 | 3.35 |
| d12 | 23.31 | 13.27 | 2.27 | 21.31 |
| d14 | 20.95 | 8.82 | 3.95 | 18.52 |

$C_1 = -1.80290 \times 10^{-4}$
$C_2 = 1.80250 \times 10^{-7}$
$C_3 = -6.31770 \times 10^{-11}$

Seventh Numerical Enbodiment

| | | f = 102.00810 fno = 1:2.92 2w = 24.0° | | |
|---|---|---|---|---|
| r1 = 75.531 | diffraction surface | d1 = 6.66 | n1 = 1.62299 | v1 = 58.2 |
| r2 = −219.065 | | d2 = 1.69 | | |
| r3 = 53.554 | | d3 = 9.00 | n2 = 1.48749 | v2 = 70.2 |
| r4 = −77.180 | | d4 = 1.85 | n3 = 1.76182 | v3 = 26.5 |
| r5 = 334.737 | | d5 = 0.15 | | |
| r6 = 62.354 | | d6 = 3.00 | n4 = 1.48749 | v4 = 70.2 |
| r7 = 120.850 | | d7 = changeable | | |
| r8 = 437.638 | | d8 = 1.40 | n5 = 1.83481 | v5 = 42.7 |
| r9 = 26.341 | | d9 = 4.00 | | |
| r10 = −92.098 | | d10 = 1.40 | n6 = 1.51742 | v6 = 52.4 |
| r11 = 29.186 | | d11 = 3.84 | n7 = 1.84666 | v7 = 23.8 |
| r12 = 226.004 | | d12 = changeable | | |
| r13 = 0.000 | aperture | d13 = 2.00 | | |
| | | d13 = changeable | | |
| r14 = 713.988 | | d14 = 4.16 | n8 = 1.48749 | v8 = 70.2 |
| r15 = −42.824 | | d15 = 8.29 | | |
| r16 = 56.648 | | d16 = 8.36 | n9 = 1.77250 | v9 = 49.6 |
| r17 = −33.585 | | d17 = 1.60 | n10 = 1.76182 | v10 = 26.5 |
| r18 = 394.039 | | d18 = changeable | | |
| r19 = −75.442 | | d19 = 7.55 | n11 = 1.84666 | v11 = 23.8 |

-continued

| | | f = 102.00810 fno = 1:2.92 2w = 24.0° | | |
|---|---|---|---|---|
| r20 = −25.037 | | d20 = 1.60 | n12 = 1.83400 | v12 = 37.2 |
| r21 = 196.576 | | | | |

| focal length changeable distance | 102.01 | 81.42 | 59.36 |
|---|---|---|---|
| d7 | 3.41 | 11.85 | 21.73 |
| d12 | 20.47 | 12.03 | 2.15 |
| d14 | 20.00 | 9.86 | 3.00 |
| d19 | 7.87 | 17.26 | 25.22 |

$C_1 = -9.18820 \times 10^{-5}$
$C_2 = 1.19170 \times 10^{-7}$
$C_3 = -5.64890 \times 10^{-11}$

Eighth Numerical Enbodiment

| | | f = 180.00418 fno = 1:3.60 2w = 13.7° | | |
|---|---|---|---|---|
| r1 = −250.911 | | d1 = 3.55 | n1 = 1.51633 | v1 = 64.1 |
| r2 = −111.510 | | d2 = 0.15 | | |
| r3 = 101.658 | | d3 = 8.97 | n2 = 1.48749 | v2 = 70.2 |
| r4 = −93.826 | | d4 = 1.89 | | |
| r5 = −86.687 | | d5 = 2.70 | n3 = 1.83400 | v3 = 37.2 |
| r6 = −847.355 | | d6 = 0.15 | | |
| r7 = 51.759 | | d7 = 5.75 | n4 = 1.48749 | v4 = 70.2 |
| r8 = 158.800 | | d8 = 11.13 | | |
| r9 = 51.995 | diffraction surface | d9 = 2.90 | n5 = 1.83481 | v5 = 42.7 |
| r10 = 37.408 | | d10 = 2.49 | | |
| r11 = 73.131 | | d11 = 3.95 | n6 = 1.48749 | v6 = 70.2 |
| r12 = −247.516 | | d12 = changeable | | |
| r13 = −2186.697 | | d13 = 1.80 | n7 = 1.83481 | v7 = 42.7 |
| r14 = 47.336 | | d14 = 4.10 | | |
| r15 = −95.398 | | d15 = 1.60 | n8 = 1.48749 | v8 = 70.2 |
| r16 = 52.429 | | d16 = 4.22 | n9 = 1.84666 | v9 = 23.8 |
| r17 = 358.965 | | d17 = changeable | | |
| r18 = 0.000 | aperture | d18 = changeable | | |
| r19 = 38.007 | | d19 = 5.16 | n10 = 1.71999 | v10 = 50.2 |
| r20 = 3906.039 | | d20 = 0.15 | | |
| r21 = 85.129 | | d21 = 4.70 | n11 = 1.51633 | v11 = 64.1 |
| r22 = −52.785 | | d22 = 3.22 | n12 = 1.58144 | v12 = 40.8 |
| r23 = 26.620 | | d23 = changeable | | |
| r24 = −24.417 | | d24 = 3.00 | n13 = 1.84666 | v13 = 23.8 |
| r25 = −27.162 | | d25 = 0.15 | | |
| r26 = 60.116 | | d26 = 4.38 | n14 = 1.48749 | v14 = 70.2 |
| r27 = 200.876 | | | | |

| focal length changeable distance | 180.00 | 154.85 | 116.55 |
|---|---|---|---|
| d12 | 2.36 | 19.23 | 35.71 |
| d17 | 35.50 | 18.63 | 2.15 |
| d18 | 12.30 | 6.33 | 0.50 |
| d23 | 25.30 | 31.28 | 37.11 |

$C_1 = -7.70900 \times 10^{-5}$
$C_2 = 2.96510 \times 10^{-8}$
$C_3 = -2.13700 \times 10^{-11}$ According to the present invention, it is feasible to accomplish the lens system with high optical performance wherein the aberration variations are corrected well during focusing against objects in the wide range from the infinity object to the near object, particularly, in the wide range of the photographic magnifications ranging to near ½×, and the optical device using the same.

In addition, according to the present invention, it is feasible to accomplish the lens system wherein the diffracting optical element is used in part of the optical system to correct well the axial chromatic aberration and chromatic aberration of magnification, which becomes worse with increase in the photographic magnification, and the optical device using the same.

What is claimed is:

1. A lens system comprising:
    a diffractive surface, and
    a first lens unit of a positive optical power, a second lens unit of a negative optical power disposed on the image side of said first lens unit, and a third lens unit of a positive optical power disposed on the image side of said second lens unit,
    wherein during focusing from an object at infinity to an object at a near distance, said first lens unit is fixed, said second lens unit moves toward an image side, and said third lens unit moves toward the object side, and
    wherein the following conditions are satisfied:

$0.40 < f1/f < 0.65$, $-0.50 < f2/f < -0.25$, and $0.40 < f3/f < 1.10$, where f1 is a focal length of said first lens unit, f2 a focal length of said second lens unit, f3 a focal length of said third lens unit, and f a focal length of the entire lens system.

2. A lens system comprising:
    a diffractive surface, and
    a first lens unit of a positive optical power, a second lens unit of a negative optical power disposed on the image side of said first lens unit, a third lens unit of a positive optical power disposed on the image side of said second lens unit, and a fourth lens unit of a negative optical power disposed on the image side of said third lens unit,
    wherein during focusing from an object at infinity to an object at a near distance, said first lens unit is fixed, said second lens unit moves toward an image side, and said third lens unit moves toward the object side, and
    wherein the following conditions are satisfied:

$0.40 < f1/f < 0.70$, $-0.45 < f2/f < -0.25$, $0.25 < f3/f < 0.55$, and $-1.0 < f4/f < -0.4$, where f1 is a focal length of said first lens unit, f2 a focal length of said second lens unit, f3 a focal length of said third lens unit, f4 a focal length of said fourth lens unit, and f a focal length of the entire lens system.

3. A lens system comprising:
    a diffractive surface, and
    a first lens unit of a positive optical power, a second lens unit of a negative optical power disposed on the image side of said first lens unit, a third lens unit of a positive optical power disposed on the image side of said second lens unit, and a fourth lens unit of a positive optical power disposed on the image side of said third lens unit,
    wherein during focusing from an object at infinity to an object at a near distance, said first lens unit is fixed, said second lens unit moves toward an image side, and said third lens unit moves toward the object side.

4. The lens system according to claim 3, which satisfies the following condition:

$0.50 < \Delta s2/|\Delta s3| < 4.00$, where $\Delta s2$ is a moving distance of said second lens unit during the focusing and $\Delta s3$ a moving distance of said third lens unit during the focusing.

5. The lens system according to claim 3, which satisfies the following conditions:

$0.20 < f1/f < 0.60$, $-0.50 < f2/f < -0.10$, $0.50 < f3/f < 1.50$, and $0.70 < f4/f < 1.80$, where f1 is a focal length of said first lens unit, f2 a focal length of said second lens unit, f3 a focal length of said third lens unit, f4 a focal length of said fourth lens unit, and f a focal length of the entire lens system.

6. The lens system according to claim 3, wherein during the focusing, said fourth lens unit is fixed relative to the image plane.

* * * * *

UNITED STATES PATENT AND TRADEMARK OFFICE
CERTIFICATE OF CORRECTION

PATENT NO. : 6,992,839 B2
APPLICATION NO. : 11/087543
DATED : January 31, 2006
INVENTOR(S) : Akira Harada It is certified that error appears in the above-identified patent and that said Letters Patent is hereby corrected as shown below:

COLUMN 4
Line 18, "2λ" should read --2 π--.
Line 64, "2λ" should read --2 π--.

COLUMN 11
Line 55, "fl" should read --f| --.

COLUMN 24
Line 13, "vi" should --vi--.
Line 28, "Enbodiment" should read --Embodiment--.
Line 52, "Enbodiment" should read --Embodiment--.

COLUMN 25
Line 18, "Enbodiment" should read --Embodiment--.
Line 55, "Enbodiment" should read --Embodiment--.

COLUMN 26
Line 35, "Enbodiment" should read --Embodiment--.

COLUMN 27
Line 1, "Enbodiment" should read --Embodiment--.
Line 42, "Enbodiment" should read --Embodiment--.

COLUMN 28
Line 22, "Enbodiment" should read --Embodiment--.

Signed and Sealed this

Eighth Day of August, 2006

JON W. DUDAS
*Director of the United States Patent and Trademark Office*